United States Patent
Ota et al.

(10) Patent No.: US 7,974,046 B2
(45) Date of Patent: Jul. 5, 2011

(54) THIN-FILM MAGNETIC HEAD WITH HEATING PORTION AND PROTRUSION ADJUSTMENT PORTION, HEAD GIMBAL ASSEMBLY EQUIPPED HEAD, MAGNETIC RECORDING/REPRODUCING APPARATUS EQUIPPED HGA, AND MANUFACTURING METHOD OF HEAD

(75) Inventors: Norikazu Ota, Tokyo (JP); Tetsuya Roppongi, Tokyo (JP); Hiraku Hirabayashi, Tokyo (JP); Yuichi Watabe, Tokyo (JP)

(73) Assignee: TDK Corporation, Tokyo (JP)

( * ) Notice: Subject to any disclaimer, the term of this patent is extended or adjusted under 35 U.S.C. 154(b) by 906 days.

(21) Appl. No.: 11/873,666

(22) Filed: Oct. 17, 2007

(65) Prior Publication Data

US 2008/0094755 A1 Apr. 24, 2008

(30) Foreign Application Priority Data

Oct. 18, 2006 (JP) ................................. 2006-283688
May 2, 2007 (JP) ................................. 2007-121606

(51) Int. Cl.
*G11B 5/56* (2006.01)
(52) U.S. Cl. ............ 360/294.7; 360/125.31; 360/125.74
(58) Field of Classification Search ............... 360/294.7, 360/125.31, 125.74
See application file for complete search history.

(56) References Cited

U.S. PATENT DOCUMENTS

| | | | |
|---|---|---|---|
| 5,991,113 A | 11/1999 | Meyer et al. | |
| 7,199,982 B2* | 4/2007 | Suk | 360/294.7 |
| 7,224,553 B2* | 5/2007 | Sasaki et al. | 360/128 |
| 7,430,098 B1* | 9/2008 | Song et al. | 360/294.7 |
| 7,542,243 B2* | 6/2009 | Lou et al. | 360/294.7 |
| 7,573,682 B2* | 8/2009 | Pust et al. | 360/294.7 |
| 7,649,713 B2* | 1/2010 | Ota et al. | 360/125.32 |
| 7,701,676 B2* | 4/2010 | Kubotera et al. | 360/294.7 |
| 2005/0117242 A1 | 6/2005 | Taguchi | |

FOREIGN PATENT DOCUMENTS

| | | |
|---|---|---|
| JP | A-11-345472 | 12/1999 |
| JP | A-2000-020917 | 1/2000 |
| JP | A 2003-288710 | 10/2003 |
| JP | A 2005-011413 | 1/2005 |
| JP | A 2005-332514 | 12/2005 |
| JP | A-2006-196127 | 7/2006 |

* cited by examiner

*Primary Examiner* — A. J. Heinz
(74) *Attorney, Agent, or Firm* — Oliff & Berridge, PLC

(57) ABSTRACT

The present invention provides a thin-film magnetic head which surely improves the writing and reading characteristic with reducing the flying height and surely handles the contact or collision with the magnetic recording medium.

A thin-film magnetic head is provided, which includes, an substrate with ABS; a read or write head element provided on an element-formed surface of the substrate; at least one protrusion adjustment portion whose end reaches a slider end surface on the ABS side, which provides on an element-formed surface of the substrate; at least one heating portion provided rear at least one protrusion adjustment portion viewed from the slider end surface on the ABS side.

19 Claims, 12 Drawing Sheets

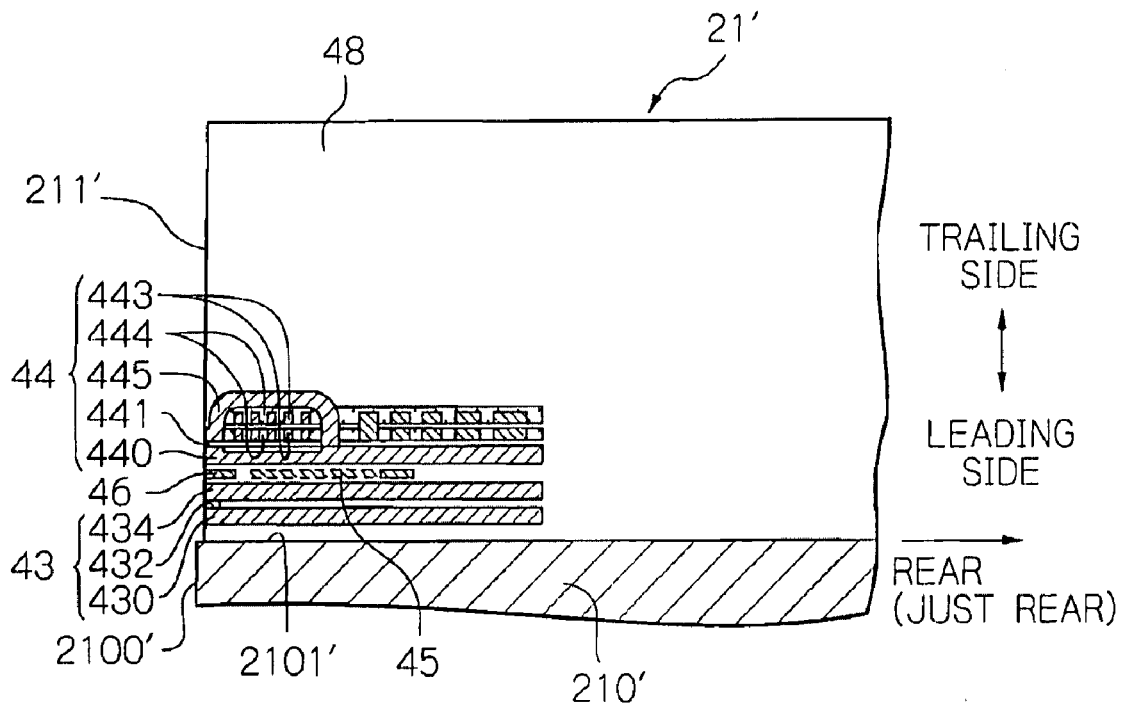
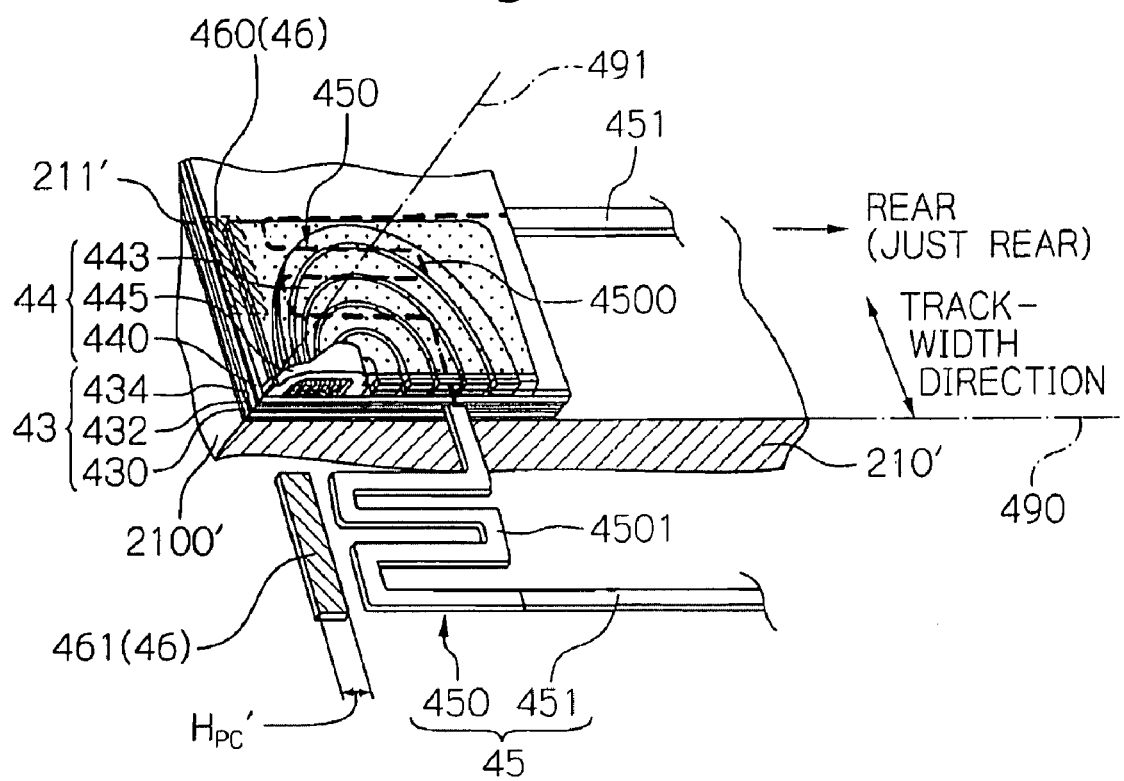

THIN-FILM MAGNETIC HEAD WITH HEATING PORTION AND PROTRUSION ADJUSTMENT PORTION, HEAD GIMBAL ASSEMBLY EQUIPPED HEAD, MAGNETIC RECORDING/REPRODUCING APPARATUS EQUIPPED HGA, AND MANUFACTURING METHOD OF HEAD

PRIORITY CLAIM

This application claims priorities from Japanese patent application No. 2006-283688, filed on Oct. 18, 2006, and Japanese patent application No. 2007-121606, filed on May 2, 2007, which are incorporated herein by reference.

REARGROUND OF THE INVENTION

1. Field of the Invention

The present invention relates to a thin-film magnetic head with a heating portion for adjusting a flying height on a magnetic recording medium in a magnetic recording technique, a head gimbal assembly (HGA) equipped the thin-film magnetic head, and a magnetic recording/reproducing apparatus equipped the HGA. And, the present invention relates to a manufacturing method of the thin-film magnetic head.

2. Description of the Related Art

A thin-film magnetic head which a magnetic disk drive apparatus, this is a representative of a magnetic recording/reproducing apparatus, comprises flies with a predetermined spacing (flying height) above a rotating magnetic disk which is a magnetic recording medium, in writing or reading signals. The thin-film magnetic head, on flying state, writes data to the magnetic disk applying a signal magnetic field using an excitation coil element this is a write coil element, and reads data with sensing a signal magnetic field from the magnetic disk using a magnetoresistive (MR) effect element that is a read head element.

With higher recording density due to increasing data storage capacity in recent years, a track width of the thin-film magnetic head is becoming smaller. In order to avoid a degradation of writing and reading performance due to the smaller track width, the flying height is becoming smaller in the recent magnetic disk drive apparatus, then the flying height is actually set to approximately 10 nm or less.

The flying height, which is a minute value as above-mentioned, needs stably to be controlled in order to maintain a well writing and reading characteristic and to avoid a crush or a thermal asperity. As the method for controlling the flying height, for example, U.S. Pat. No. 5,991,113, Japanese patent Publication No. 2005-332514A, and Japanese patent Publication No. 2005-11413A describe a technique for adjusting the flying height with providing a heating portion in the thin-film magnetic head, and by protruding an end of a head element to a magnetic disk direction by heat of the heating portion.

In the technique for adjusting the flying height by heat of the heating portion, as the protrusion (protuberance) shape of an opposed-to-medium surface including the end of the head element is widely changed by a setting position of the heating portion, it is very important to obtain the appropriate setting position of the heating portion. For example, Japanese patent Publication No. 2005-332514A describes a structure that the two heating portions are positioned on both sides to a track-width direction, respectively, then this structure prevents the head element from a contact to a recording medium surface. Further, Japanese patent Publication No. 2005-11413A describes a structure which the heating portion is positioned on a rear side to a gap-depth direction of a recording head element, then this structure makes an effective protrusion near a magnetic gap layer.

Furthermore, in a head for perpendicular magnetic recording, US patent Publication No. 2005/117242 describes a structure which the heating portion, that is not for a protrusion, is positioned vicinity of a main magnetic pole. Further, in a head slider which does not comprise the heating portion, Japanese patent Publication No. 2003-288710A describes a technique providing a protective projection for preventing a collision with a projection on the recording medium and the head element which is protruded by a heat expansion of a protective film due to a heat of a thin-film coil pattern.

However, even above-mentioned conventional arts have a problem that it is difficult to be consistent a improvement of the writing and reading characteristic due to a reduction of the flying height with a measure to the contact or collision with the head and the magnetic recording medium.

In the case of protruding the opposed-to-medium surface using the heating portion of above-mentioned conventional art, it is preferable to protrude the end of the head element most in order to obtain a improvement of the writing and reading characteristic with closing the end of the head element to the magnetic disk surface. Actually, for example, when an end surface of an overcoat portion covering the head element protrudes most, the end of the head element separated from the end surface position leaves substantially from the magnetic disk surface as the thin-film magnetic head has a predetermined pitch angle.

Here, in case of protruding most the end of the head element, that is to say, an end of the excitation coil element or an end of the MR effect element, the space of the end of the head element and the magnetic recording element becomes very small, then the writing and reading characteristic surely improves. However, because of the very small flying height, the problem, that the end of the head element is easy to contact or collide the magnetic recording medium, occurs. If the end of the head element contacts or collides the magnetic recording medium, a thermal asperity and crush occur and the writing and reading characteristic is affected, then a risk of a breakage of the magnetic disk or the head element increases.

Recently, surely in order to maintain the very small flying height at predetermined value, a trial temporarily to contact (touch down) with the magnetic disk surface and thin-film magnetic head has accomplished. With an output of the MR effect element at the touch down or a supply power to the heating portion, a measurement or adjustment of the flying height is possible. At the touch down, if the end of the head element protrudes most, at this intentional contact, a contact part also becomes the end of the magnetic head element, then the problem that is a same as above-mentioned occurs.

Further, it is possible to measure or adjust the flying height without the touch down, then various has been tried, but in any method the same problem may occur if the end of the head element protrudes most on a low flying state.

Further, this situation is the same in the thin-film magnetic head for perpendicular magnetic recording which recently is noticed. In the case of this head, as a main magnetic pole layer of the excitation coil element tends to protrude most, for example, if the touch down operation is repeated, it is confirmed by the inventor that an overwrite characteristic degrades by the wearing away of an end of the main magnetic pole layer.

Also, to handle this problem, the providing the protective projection is also thought as the art described in Japanese patent Publication No. 2003-288710A, but as the height of the protrusion is fixed, it is impossible to adjust the flying height appropriately according to an usage environment such as the position, temperature, or atmospheric pressure on the magnetic disk, then it is difficult surely to the maintain the space of the end of the head element and the magnetic recording element at the predetermined value.

BRIEF SUMMARY OF THE INVENTION

Therefore, it is an object of the present invention to provide a thin-film magnetic head which surely tries to improve the writing and reading characteristic with reducing the flying height and surely to handle the contact or collision to the magnetic recording medium, a HGA equipped the thin-film magnetic head, and a magnetic recording/reproducing apparatus equipped the HGA.

Further, it is an object of the present invention to provide a manufacturing method which the thin-film magnetic head can be surely manufactured with.

Here, some terms will be defined before explaining the present invention. In a layered structure of elements or parts formed on an element-formed surface of the slider substrate, a component that is closer to the element-formed surface than a standard layer is defined to be "below" or "lower" in relation to the standard layer, and a component that is in the stacking direction side of the standard layer is defined to be "above" or "upper" in relation to the standard layer. For example, "there is an lower magnetic pole layer on an insulting layer" means that the lower magnetic pole layer is in the stacking direction side of the insulating layer. Also, if a distance from a slider end surface on an air bearing surface (ABS) side of a component is larger than a distance from a slider end surface on the standard layer, this component is defined to be "rear" viewed from the slider end surface side. Therefore, this "rear" includes "just at the rear" that a distance from the substrate of the component equals to a distance from the substrate of the standard layer, and "diagonally rear" that these distances are not equal. The distance from the slider end surface side of the component defines as a distance (spacing) between the slider end surface and the end of the slider end surface side of the component, and the distance from the substrate of the component defines as a distance (spacing) between the element-formed surface of the substrate and the end of the substrate side of the component.

According to the present invention, a thin-film magnetic head is provided, which includes, a substrate with ABS; a read or write head element provided on an element-formed surface of the substrate; at least one protrusion adjustment portion whose end reaches a slider end surface on the ABS side, which provides on the element-formed surface of the substrate; at least one heating portion provided rear at least one protrusion adjustment portion viewed from the slider end surface side on the ABS side.

In the thin-film magnetic head of the present invention, the protrusion adjustment portion protrudes to a magnetic recording medium direction by heat of the heating portion in writing or reading operation. In this case, this protrudes slightly much than an end of write head element or an end of read head element which is positioned vicinity of the slider end surface. Here, although the protrusion adjustment portion protrudes most, a distance between the end of write head element and the end of read head element which are positioned vicinity of a pole and the magnetic recording medium surface is enough small. Further, in this situation, for example, by a change of an environment factor or an impact from outside so on, or by an intentional contact (touch down) operation, if the thin-film magnetic head contacts or collides the magnetic recording medium, a contact or collision position becomes the protrusion adjustment portion, then a contact or collision of the end of write head element and the end of read head element is avoided.

Also, that the heating portion is provided rear the protrusion adjustment portion viewed from the slider end surface on the ABS side includes not only a case that the heating portion is positioned on a perpendicular line of the slider end surface stretched from the protrusion adjustment portion (positioned just at the rear) but also a case that it is positioned diagonally direction toward this perpendicular line (positioned diagonally rear). In other words, the position includes, which reaches the protrusion adjustment portion from a side opposed to the slider end surface with the heat from the heating portion having a spread.

In the thin-film magnetic head of the present invention, it preferable that at least one end of the protrusion adjustment portion is provided on a position which should be protruded most by heat of at least one heating portion on the slider end surface on the ABS side. With respect to the thin-film magnetic head, it is very important appropriately to design a protrusion profile of the slider end surface on the ABS side for trying to improve the writing and reading characteristic due to a reduction of the flying height and for surely handling the contact or collision with the magnetic recording medium. For example, the protrusion profile is required, which the end of the magnetic head element comes close to the magnetic recording medium as much as possible and it does not protrudes most nor contact first. In this case, it is possible to obtain the protrusion profile which has such effect, by positioning the end of the protrusion adjustment portion at a position which wants to protrude most in a design.

Furthermore, it is also preferable that at least one of the at least one heating portion is provided just at the rear at least one of at least one protrusion adjustment portion viewed from the slider end surface on the ABS side. Furthermore, it is also preferable that at least one protrusion adjustment portion is a layer formed of a metal material. Furthermore, it is also preferable that at least one of at least one heating portion and at least one of at least one protrusion adjustment portion is provided between the read head element and the write head element.

Furthermore, the thin-film magnetic head according to the present invention may be for perpendicular magnetic recording. Here, if the write head element is for perpendicular magnetic recording and has the main magnetic pole layer on the read head element side, it is also preferable that at least one protrusion adjustment portion is provided between this main magnetic pole layer and the read head element. Furthermore, if a shielding-between-element layer is provided between the write head element and the read head element, it is also preferable that at least one protrusion adjustment portion is provided between the write head element and the shielding-between-element layer.

Furthermore, in the case where the write head element is for perpendicular magnetic recording, it is also preferable that the write head element comprises a backing coil portion closer to the read head element side than the main magnetic pole layer, and that at least one protrusion adjustment portion reaches at least between the backing coil portion and the slider end surface on the air bearing surface side and is connected to the shielding-between-element layer.

Furthermore, likewise, in the case where the write head element is for perpendicular magnetic recording, it is also preferable that the write head element comprises the backing coil portion closer to the read head element side than the main magnetic pole layer, and that at least one heating portion is provided between the backing coil portion and the shielding-between-element layer.

Furthermore, likewise, in the case where the write head element is for perpendicular magnetic recording, it is also preferable that at least one protrusion adjustment portion is a layer formed of a magnetic material. In above-mentioned structure that the write head element is for perpendicular magnetic recording, in the case where that at least one protrusion adjustment portion is formed of the magnetic material layer, this protrusion adjustment portion makes a magnetic slope of the write magnetic filed large, then contributes to restraint of a side fringe as it serves as a shield to shunt a magnetic flux toward the main magnetic pole layer.

Furthermore, likewise, in the case where the write head element is for perpendicular magnetic recording, it is also preferable that at least one protrusion adjustment portion is two protrusion adjustment portions, the write head element comprises the main magnetic pole layer on the read head element side, and these two protrusion adjustment portions are provided on both sides on track-width direction of the main magnetic pole layer, respectively.

Furthermore, it is also preferable that the write head element is for perpendicular magnetic recording and comprises the backing coil portion on the read head element side, and that at least one protrusion adjustment portion is provided between this backing coil portion and the read head element. Furthermore, it is also preferable that the shielding-between-element layer is provided between the write head element and the read head element, and that at least one protrusion adjustment portion is provided between the write head element and this shielding-between-element layer.

Also, the thin-film magnetic head according to the present invention may be for longitudinal magnetic recording. That is to say, it is also preferable that at least one protrusion adjustment portion is two protrusion adjustment portions, and the write head element is for longitudinal magnetic recording and comprises a magnetic pole layer on the read head element side, and the read head element comprises a shield layer on the write head element side, and the two protrusion adjustment portions are provided between this magnetic pole layer and this shield layer and a position symmetric each other with respect to a center line which is perpendicular to track-width direction of the write head element and the read head element on the slider end surface on the ABS side.

Furthermore, it is also preferable that at least one protrusion adjustment portion is two protrusion adjustment portions, and the write head element is for longitudinal magnetic recording, and the two protrusion adjustment portions are provided on both sides in track-width direction of the write head element, on both sides in track-width direction of the read head element, or on both sides in track-width direction of the area between the write head element and the read head element.

Furthermore, in the case where the write head coil element is for perpendicular magnetic recording and for longitudinal magnetic recording, respectively, a write coil element which the write head element comprises may have a helical coil structure.

Also, in above-mentioned thin-film magnetic head according to the present invention, it is also preferable that at least one protrusion adjustment portion is connected to ground. This can reduce an electrostatic bad effect which occurs in the case of the contact or collision of the protrusion adjustment portion with the magnetic recording medium.

According to the present invention, a HGA is provided, which includes, above-mentioned thin-film magnetic head, a support mechanism for supporting said thin-film magnetic head, trace conductors for the write head element and the read head element, and leads for supplying power to the heating portion.

According to the present invention, a magnetic recording/reproducing apparatus is provided, which includes, at least one above-mentioned HGA, further includes at least one magnetic recording medium, and a recording/reproducing and heating controlling circuit for controlling the write and read operation which the thin-film magnetic head performs to at least one magnetic recording medium and also controlling power supplying to the heating portion. Also, in this apparatus, it is also preferable that at least one magnetic recording medium includes at least one contact lane on its own surface portion which the thin-film magnetic head contacts with in the case of measuring a flying height.

According to the present invention, a manufacturing method of the thin-file magnetic head comprising steps of: forming a plurality of heating head element which includes a read head element, a write head element, a heating portion positioned between the read head element and the write head element, and a protrusion adjustment portion positioned between the read head element and the write head element and positioned at least a place exposed on a polished surface that is a medium opposed surface; forming an overcoat portion covering the read head element, the write head element, the heating portion, and the protrusion adjustment portion when or after forming the heating head element; separating a row bar or slider which includes at least one heating head element with cutting the substrate on which the heating head element and the overcoat portion are formed; forming the medium opposed surface which an end portion of the protrusion adjustment portion protrudes with performing a polish that a polishing rate of the protrusion adjustment portion is smaller than that of the overcoat portion toward a cutting surface which an end portion of the read head element, an end portion of the write head element, the protrusion adjustment portion, and the overcoat portion are exposed, in the row bar or slider.

Here, it is also preferable that the method uses a layer consisted of a metal material as the protrusion adjustment portion, and uses an oxide or nitride insulting material as the overcoat portion, and uses a chemical mechanical polishing method as a polish.

According to the present invention, the thin-film magnetic head surely tries to improve the writing and reading characteristic with reducing the flying height and surely handles the contact or collision with the magnetic recording medium. This can improve both the writing and reading characteristic and reliability of the magnetic recording/reproducing apparatus.

BRIEF DESCRIPTION OF THE SEVERAL VIEWS OF THE DRAWINGS

FIG. 6a shows a cross-sectional view taken along line A-A in FIG. 2, illustrating a configuration of a main part in an alternative embodiment of the thin-film magnetic head according to the present invention;

FIG. 6b shows a perspective view illustrating a cross section taken along line A-A viewed from obliquely upward;

DETAILED DESCRIPTION OF THE INVENTION

Figure 1:
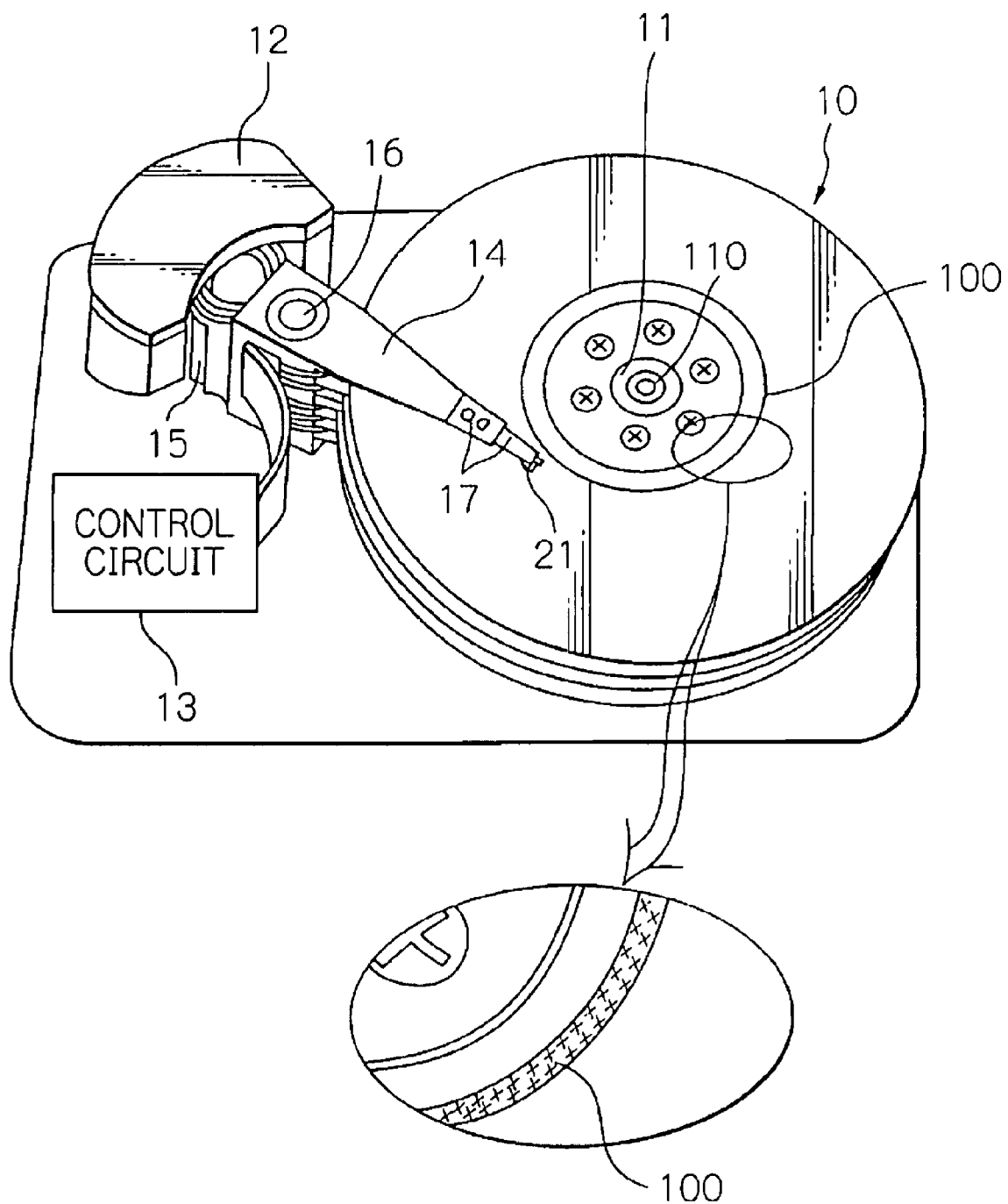
FIG. 1 shows a perspective view schematically illustrating a major portion of an embodiment of the magnetic recording/reproducing apparatus according to the present invention.

FIG. 1 shows a perspective view schematically illustrating a major portion of an embodiment of the magnetic recording/reproducing apparatus according to the present invention.

In FIG. 1, a magnetic disk drive apparatus is shown as the magnetic recording/reproducing apparatus; reference numeral 10 indicates a plurality of magnetic disks (magnetic recording media) rotating around a rotational axis 110 of a spindle motor 11, 12 indicates an assembly carriage device for positioning a thin-film magnetic head (slider) 21 on a track, and 13 indicates a recording/reproducing and heating control circuit for controlling read/write operations of the thin-film magnetic head and controlling a heat operation of a heating portion which will be described below, respectively.

The assembly carriage device 12 is provided with a voice coil motor (VCM), a plurality of drive arms 14 is provided on the VCM 15. These drive arms 14 are rotatable around a pivot bearing axis 16 by means of the VCM 15 and stacked in the direction along this axis. An HGA 17 is provided on the end portion of each drive arm 14. A thin-film magnetic head (slider) 21 is mounted on each HGA 17 in such a way as to be opposed to the surface of the magnetic disk 10. The each number of the magnetic disks 10, the drive arms 14, the HGAs 17 and the thin-film magnetic heads (sliders) 21 can also be only one.

The magnetic disk can comprise a contact lane 100 on its own surface portion which the thin-film magnetic head 21 contacts (touch down) in the case of measuring or adjusting the flying height. In other words, the contact lane 100 is a dedicated area to touch down the thin-film magnetic head 21. This contact lane 100 is provided in an area except a signal recording area that is a data area or a servo area on the magnetic disk 10. Further, data signals for confirming the flying height in this contact lane 100 can record. Further, a surface of the contact lane 100 can be a surface performed abrasion-resistant process such as very fine concavo-convex process or rough surface process. These processes can perform, for example, by illuminating ion beam.

With providing such contact lane 100, it can prevent extreme friction and damage between the magnetic disk and the head in touch down of the thin-film magnetic head 21, the magnetic disk drive apparatus is realized, which is suitable for touch down.

Further, a setting position of the contact lane 100 can be any of inner circumference side, outer circumference side, or intermediate side of the magnetic disk 10. Furthermore the contact lane 100 can be provided on both of inner circumference side and outer circumference side of the magnetic disk 10 to measure a flying height difference caused by a difference between linear velocity of inner circumference side and linear velocity of outer circumference side, and can be a plurality of ones in the magnetic disk 10.

The recording/reproducing and heating control circuit 13, as not shown in the figure, can provided with, for example, a read/write (R/W) channel which sends/receives and handles signals in write and read operations, a head amplifier which comprises the heating controlling circuit controlling a heating operation of the heating portion described below, a controller which controls an interface and so on, and a CPU which controls the whole circuit.

Figure 2:
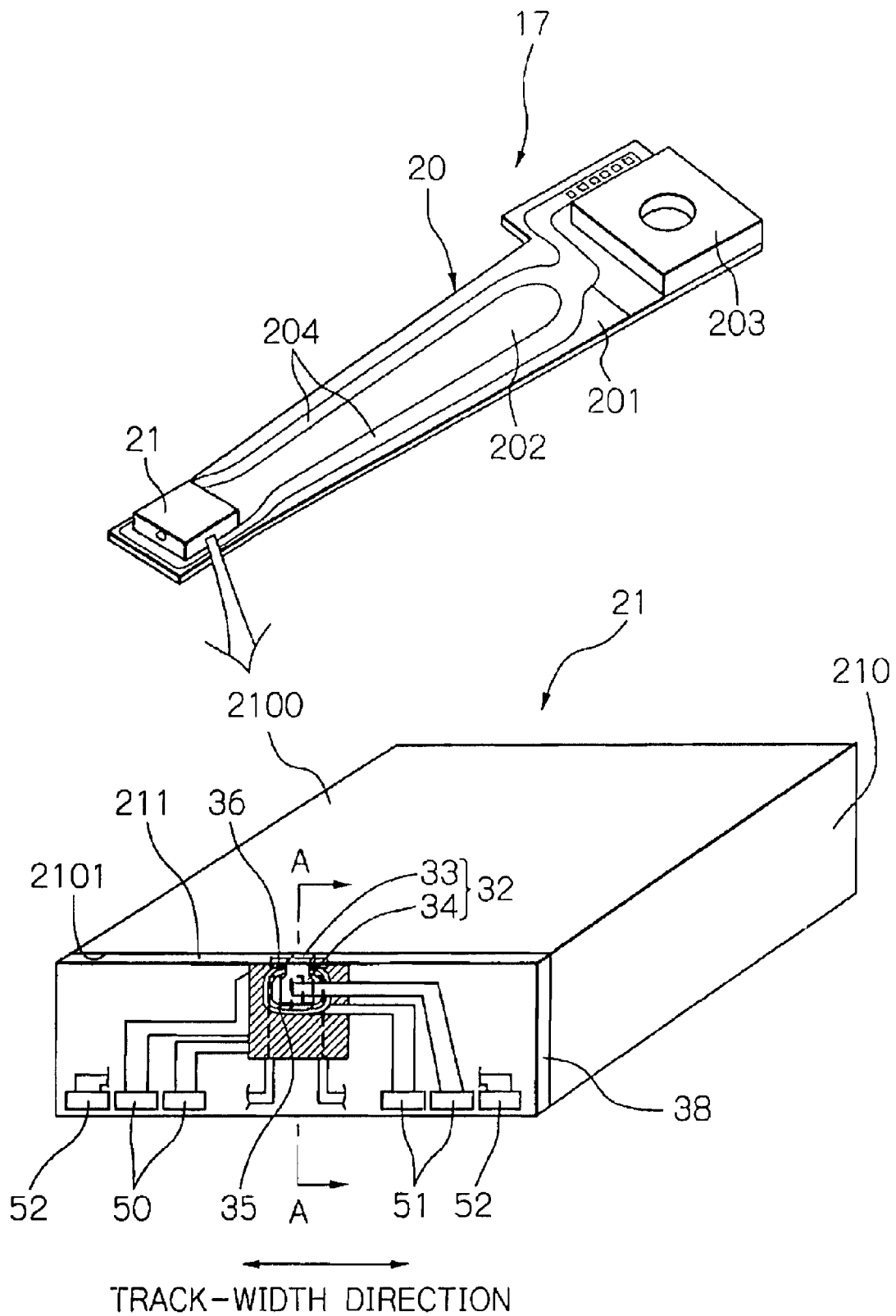
FIG. 2 shows a perspective view illustrating an embodiment of an HGA according to the present invention and a thin-film magnetic head (slider) attached on the end of the HGA.

FIG. 2 shows a perspective view illustrating an embodiment of an HGA according to the present invention and a thin-film magnetic head (slider) attached on the end of the HGA.

According to FIG. 2, the HGA 17 is constructed by fixing a thin-film magnetic head 21 having the magnetic head element on a flexure 202 in an end portion of a suspension 20 that is a support mechanism for supporting the thin-film magnetic head 21 and by electrically connecting one end of a wiring member 204 to signal electrodes of the thin-film magnetic head 21.

The suspension 20 includes a load beam 201, a flexure 202 with elasticity fixed on and supported by the load beam 201, a base plate 203 provided on the base of the load beam 201, and a wiring member 204 which is provided on the flexure 202 and consists of lead conductors and connection pads electrically connected to the ends of the lead conductors. While not shown, a head drive IC chip may be attached on a position between the ends of the suspension 20.

Also in FIG. 2, the thin-film magnetic head (slider) 21 includes a slider substrate 210 having an air bearing surface (ABS) 2100 processed so as to provide an appropriate flying height, a magnetic head element 32 formed on/above the element formation surface 2101 which is a side surface when the ABS 2100 is at the bottom, a heating portion 35 as a flying height adjustment element formed on/above the element formation surface 2101, a protrusion adjustment portion 36 for adjusting the protrusion due to heat of the heating portion 35, an overcoat portion 38 formed on/above the element formation surface 2101 so as to cover each and whole the magnetic head element 32, the heating portion 35 and the protrusion adjustment portion 36, pairs of signal electrodes 50 and 51 exposed in the surface of the overcoat portion 38, and pairs of drive electrodes 52 exposed in the surface of the overcoat portion 38.

Here, the magnetic head element 32 includes a MR effect element 33 which is a read head element for reading data signal, a excitation coil element 34 which is a write head element for writing data signal, and the signal electrodes 50 and 51 are electrically connected with the MR effect element 33 and the excitation coil element 34, respectively. And the drive electrodes 52 are electrically connected with the heating portion 35.

In the MR effect element 33 and the excitation coil element 34, each end of these elements reaches the slider end surface 211 on the ABS 2100 side. The slider end surface 211 is a opposed-to-medium surface opposed the magnetic disk toward the thin-film magnetic head 21 except the ABS 2100, and a surface which is consist of the end surface of the overcoat portion 38 mainly. The ends of these elements become opposed to the magnetic disk, then the head 21 performs the read operation of data signals by sensing signal magnetic fields and the write operation of data signals by applying signal magnetic fields. The one ends of these elements and their vicinity reached the slider end surface 211 are coated with ultra thin diamond-like carbon (DLC) and so on for protecting.

The heating portion 35 is provided between the MR effect element 33 and the excitation coil element 34, and is an element adjusting the flying height of the thin-film magnetic head 21 toward the magnetic disk 10, and heats by the current flow. The magnetic head element 32 protrudes to the magnetic disk surface direction in form to let the head end surface 300 project by its heat expansion with the heat occurred the current flow to the heating portion 35 or by the heat expansion of the material surrounding it. By controlling the protrusion operation with adjusting the current flow to the heating portion 35, it is possible to control the flying height.

The protrusion adjustment portion 36 is provided between the MR effect element 33 and the excitation coil element 34 like the heating portion 35, and its own end reaches the slider end surface 211. Also, with respect to a positional relationship between the heating portion 35 and the protrusion adjustment portion 36, it is constituted such as the heating portion 35 or at least one part of a heating part of the heating portion 35 certainly exists on rear (just at the rear or diagonally rear) of the protrusion adjustment portion 36 viewed from the slider end surface 211. The protrusion adjustment portion 36 need not be provided between the MR effect element 33 and the excitation coil element 34, and the protrusion adjustment portion 36 is provided at a position to protrude most on the slider end surface 211 in case of designing the protrusion profile of the slider end surface 211. As described below, while the protrusion adjustment portion 36 protrudes most in the write or read operation, a distance of between an end of the MR effect element 33 and an end of the excitation coil element 34 positioned a vicinity of the pole and the magnetic disk surface is enough small. Whereas, the protrusion adjustment portion 36 becomes the contact or collision part in the case where thin-film magnetic head 21 contacts or collides with the magnetic disk, then the protrusion adjustment portion 36 makes the contact or collision of the end of the MR effect element 33 and the end of the excitation coil element 34 avoid.

Two drive electrodes 52 are arranged on both sides of four signal electrodes 50 and 51, respectively. As described in Japanese patent Publication No. 2004-234792A, this arrangement can prevent a cross talk between a wiring of the MR effect element 33 and a wiring of the excitation coil element 34. If a predetermined cross talk is permitted, two drive electrodes 52 may be arranged in any position of four signal electrodes 50 and 51. The numbers of the electrodes are not limited to the mode in FIG. 2. In FIG. 2, there are six electrodes, however it is also possible to provide five electrodes and a ground connecting to the slider substrate.

Figure 3A:
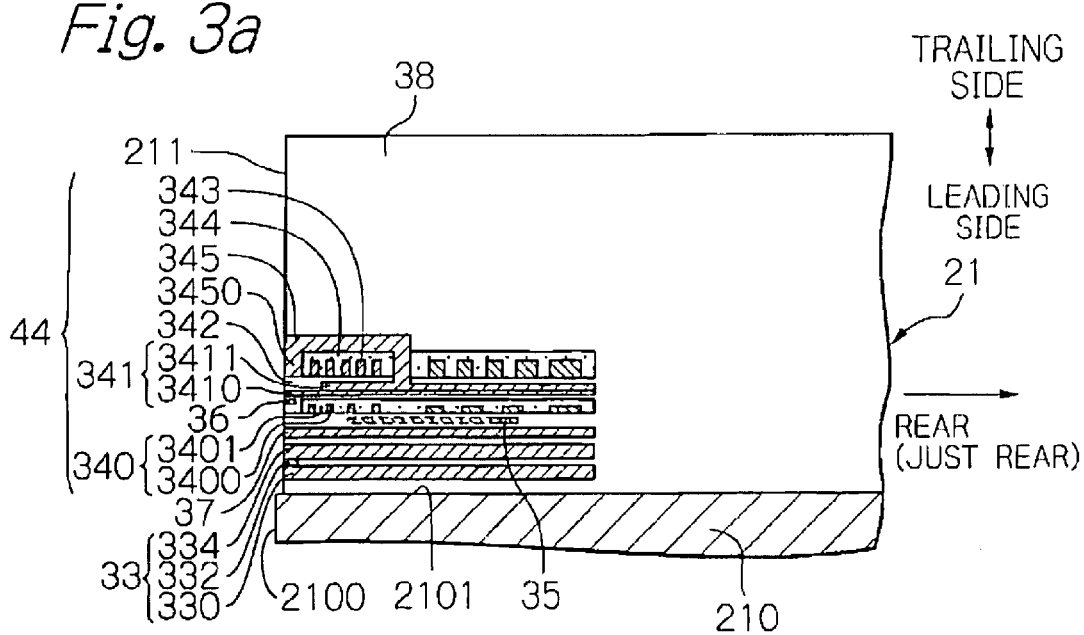
FIG. 3a shows a cross-sectional view taken along line A-A in FIG. 2, illustrating a configuration of a main part of the thin-film magnetic head according to the present invention.
Figure 3B:
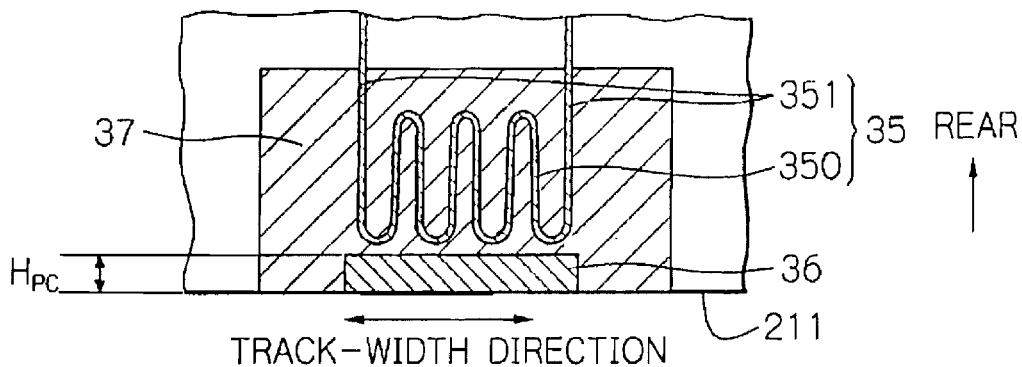
FIG. 3b shows a plain view illustrating the heating portion 35 and the protrusion adjustment portion 36 viewed through from the element formation surface 2101.
Figure 3C:
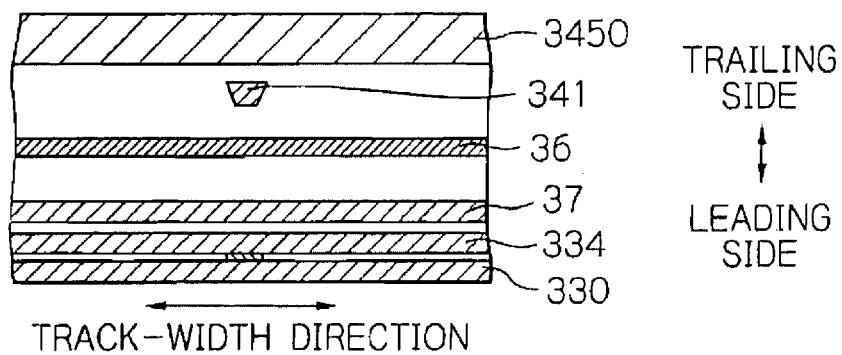
FIG. 3c shows a plain view illustrating a structure of the slider end surface 211 viewed from the ABS 2100 side.

FIG. 3a shows a cross-sectional view taken along line A-A in FIG. 2, illustrating a configuration of a main part of the thin-film magnetic head according to the present invention. FIG. 3b shows a plain view illustrating the heating portion 35 and the protrusion adjustment portion 36 viewed through from the element formation surface 2101. FIG. 3c shows a plain view illustrating a structure of the slider end surface 211 viewed from the ABS 2100 side.

In FIG. 3a, reference numeral 210 indicates a slider substrate made of, for example, AlTiC ($Al_2O_3$—TiC) and so on, which has an ABS 2100 opposing the surface of the magnetic disk. The MR effect element 33, the excitation coil element 34, the heating portion 35, the protrusion adjustment portion 36, and the overcoat portion 38 that protects these elements are formed on/above an element formation surface 2101 on the slider substrate 210.

The MR effect element 33 includes an MR effect multilayer 332, and a lower shield layer 330 and an upper shield layer 334 sandwiching the MR effect multilayer 332. The MR effect multilayer 332 includes a current-in-plane (CIP) giant magnetoresistive (GMR) effect multilayered film, a current-perpendicular-to-plane (CPP) GMR effect multilayered film, or a tunnel magnetoresistive (TMR) effect multilayered film, and senses a signal field from the magnetic disk with an extremely high sensitivity. The upper and lower shield layers 334 and 330 prevent the MR effect multilayer 332 from receiving an external magnetic field that causes noise.

If the MR effect multilayer 332 includes a CIP-GMR effect multilayered film, upper and lower shield gap layers for insulation are provided between the MR effect multilayer 332 and respective upper and lower shield layers 334 and 330. Further, an MR lead conductor layer is formed for supplying a sense current to the MR effect multilayer 332 and bringing out a reproduction output. On the other hand, when the MR effect multilayer 332 includes a CPP-GMR effect multilayered film or a TMR effect multilayered film, the upper and lower shield layers 334 and 330 also function as upper and lower electrodes, respectively. In this case, the upper and lower shield gap layers and the MR lead conductor layer are not needed and are omitted. Though not shown in the figure, insulating layers, or bias insulating layers and hard bias layers for applying a bias magnetic field for stabilization of a magnetic-domain may be formed on both sides along the track-width direction of the MR effect multilayer 332.

If the MR effect multilayer 332 includes for example the tunnel magnetoresistive (TMR) effect multilayered film, it has a stacked structure of an antiferromagnetic layer formed of IrMn, PtMn, NiMn, RuRhMn, etc., with a thickness of approximately 5-15 nm; a pinned layer whose magnetization direction is fixed by the antiferromagnetic layer and which consist of a three layer films, for example, sandwiching the non-magnetic metal film such as Ru with ferromagnetic layers such as CoFe; a tunnel barrier layer which consists of a non-magnetic dielectric film that is a metal layer formed of Al, AlCu, Mg, etc., with a thickness of approximately 0.5-1 nm is oxidized by natural oxidation or oxygen in a vacuum apparatus; and a free layer which is coupled with the pinned layer by tunnel exchange coupling through the tunnel barrier layer and which consists of two layer film which are a ferromagnetic film formed of, for example, CoFe, etc. with a thickness of approximately 1 nm and a ferromagnetic film formed of NiFe, etc. with a thickness of approximately 3-4 nm.

Also, the lower shield layer 330 and the upper shield layer 334 are formed of, for example, NiFe (permalloy so on), CoFeNi, CoFe, FeN or FeZrN, etc. with a thickness of approximately 0.1-3 µm by using a pattern plating method such as frame plating.

According to FIG. 3a, the excitation coil element 34 is for perpendicular magnetic recording, and includes a backing coil portion 340, a main magnetic pole layer 341, a gap layer 342, a write coil layer 343, a write coil-insulating layer 344, and an auxiliary magnetic pole layer 345. Shielding-between-elements 37 are provided between the excitation coil element 34 and the MR effect element 33 for magnetically shielding between these elements.

The main magnetic pole layer 341 is a magnetic path to guide and converge the magnetic flux excited by currents flowing through the write coil layer 343 to a perpendicular magnetic recording layer of the magnetic disk, and consists of a main magnetic pole main layer 3410 and a main magnetic pole auxiliary layer 3411. The length (thickness) in the stacking direction of the end portion in the slider end surface 211 side of the main magnetic pole layer 341 corresponds a thickness of only the main magnetic pole main layer 3410, and becomes smaller than that of the other portions. As a result, the main magnetic pole layer 341 can generate a fine write field corresponding to higher density recording. The main magnetic pole main layer 3410 and the main magnetic pole auxiliary layer 3411 are formed of, for example, NiFe, CoFeNi, CoFe, FeN or FeZrN, etc. with a thickness of approximately 0.05-1 µm and 0.1-3.5 µm by using a pattern plating method such as frame plating, respectively.

An end portion in the slider end surface 211 side of the auxiliary magnetic pole layer 345 becomes a trailing shield portion 3450 whose cross-section layer is wider than that of the other portion of the auxiliary magnetic pole layer 345. The trailing shield portion 3450 is opposed to the end of the slider end surface 211 side of the main magnetic pole layer 341 via a gap layer 342. Providing such trailing shield portion 3450, the magnetic slope between the end of the trailing shield portion 3450 and the end of the main magnetic pole layer 341 is steeper by the shunt effect of the magnetic flux. As a result, a read error rate can become smaller as a jitter of the signal output becomes smaller.

The auxiliary magnetic pole layer 345 is formed of, for example, NiFe, CoFeNi, CoFe, FeN or FeZrN, etc. with a thickness of approximately 0.1-4 µm by using a pattern plating method such as frame plating. Also, the gap layer 342 is formed of $Al_2O_3$, $SiO_2$, AlN, or DLC, etc. with a thickness of approximately 0.01-0.2 µm by using such as sputtering or CVD.

The write coil layer 343 is formed in such a manner that it passes at least between the main magnetic pole layer 341 and the auxiliary magnetic pole layer 345 between one turn. The write coil-insulating layer 344 surrounds the write coil layer 343, and is provided for electrically insulating between the write coil layer 343, and the main magnetic pole layer 341 and the auxiliary magnetic pole layer 345. The write coil layer 343 is formed of, for example, Cu, etc. with a thickness of approximately 0.3-5 µm by using such as frame plating. The write coil-insulating layer 344 is formed of, for example, a heat-cured photo resist, etc. with a thickness of approximately 0.5-7 µm by using such as photolithography. While the write coil layer 343 is shown as a single layer in FIG. 3a, it may consist of two or more layers structure or a helical coil structure. The helical coil structure is a longitudinal winding structure that a line pattern of the write coil layer alternately passes a lower part and an upper part of the magnetic pole layer (for example, the main magnetic pole layer).

The backing coil portion 340 is provided below the MR effect element 33 side toward the excitation coil element 34. The backing coil portion 340 consists of a backing coil layer 3400 and a backing coil-insulating layer 3401, and the backing coil portion 340 suppresses the wide area adjacent-track erase (WATE) behavior which is an unwanted write or erasing operation to the magnetic disk, by generating a magnetic flux for negating the magnetic loop that arises from the main magnetic pole layer 341 and the auxiliary magnetic pole layer 345 through the upper and lower shield layers of the MR effect element 33. Further, the backing coil layer 3400 and the backing coil-insulating layer 3401 are formed of a same material as the write coil layer 343 and the write coil-insulating layer 344, respectively.

The heating portion 35 is provided between the MR effect element 33 and the excitation coil element 34, and in this embodiment, it is provided between shielding-between-elements 37 and the backing coil portion 340. Also, the position of the heating portion 35 is rear (in this embodiment, diagonally rear) the protrusion adjustment portion 36 whose end reaches the slider end surface 211 viewed from the slider end surface 211 side. As shown in FIG. 3b, the heating portion 35 has a heating line layer 350 meandered one line as rectangle wave in the layer, and two lead line layers 351 which connects the both ends of the heating line layer 350, and is a current flow path with a predetermined length. One end of the lead line layer 351 is connected the drive electrodes 52 (FIG. 2), the heating portion 35 takes power supply for the heating from the recording/reproducing and heating control circuit 13 (FIG. 1) via this drive electrodes 52. The shape of the heating line layer 350 is not limited to this shape of rectangle wave, it is also possible to be one line shape, U-shape, or spiral shape.

Here, the heating line layer 350 can be formed of, for example, NiCu, NiCr, Ta, W, Ti, Cu, Au or NiFe, etc. with a thickness of approximately 0.01-5 µm. Further, the lead line layer 351 can be formed of a same material as the heating line layer 350.

In FIG. 3a, the protrusion adjustment portion 36 is provided between the MR effect element 33 and the excitation coil element 34, and in this embodiment, it is provided between shielding-between-elements 37 and the main magnetic pole layer 341. Also, the protrusion adjustment portion 36 can be provided between the backing coil portion 340 and the slider end surface 211, and can be reach between these, and it can be reach a position that its end reaches the slider end surface 211. In short, it exposes in the slider end surface 211. Further, as shown in FIG. 3b, with respect to a positional relationship between the heating portion 35 and the protrusion adjustment portion 36, it is constituted such as the heating portion 35 certainly exists rear the protrusion adjustment portion 36 viewed from the slider end surface 211 side. The protrusion adjustment portion is a layer formed of, for example, a metal material, and protrudes by heat of the heating portion in writing or reading operation. In this case, the protrusion adjustment portion 36 protrudes slightly much than the end of the MR effect element 33 and the excitation coil element 34 which are positioned vicinity of the slider end surface 211.

Here, although the protrusion adjustment portion 36 protrudes most, a distance between the end of the MR effect element 33 and the end of the excitation coil element 34 which are positioned vicinity of a pole, and the magnetic recording medium surface is enough small. Further, in this situation, for example, by change of an environment factor or an impact from outside so on, or by an intentional contact (touch down) operation, if the thin-film magnetic head 21 contacts or collides the magnetic disk, a contact or collision position becomes the protrusion adjustment portion 36, then a contact or collision of the end of the MR effect element 33 and the end of the excitation coil element 34 are avoided.

While not shown, the protrusion adjustment portion 36 can be grounded to the slider substrate 210 so on with providing a predetermined lead layer or connecting to a grounded layer. This can reduce an electrostatic bad effect which occurs in the case of the contact or collision of the protrusion adjustment portion 36 with the magnetic recording disk.

The protrusion adjustment portion 36 is formed of, for example, nonmagnetic metal film of Cu, Al, Ru, Ti, Rh, W, Si, Au or alloy which consists of these elements, etc. or magnetic metal film of NiFe (permalloy so on), CoFeNi, CoFe, FeN or FeZrN, etc. with a thickness of approximately 0.5-5 μm by using such as sputtering. By selecting construction material of the protrusion adjustment portion 36, a degree that the protrusion adjustment portion 36 is recessed in the case of MR height process which will be explained below is determined. This can adjust the protrusion profile of the slider end surface 211. Also, the overcoat portion 38 is formed of, for example, an oxide insulting material such as $Al_2O_3$ (alumina), $SiO_2$, or SiO or a nitride insulting material such as AlN, SiN or SiC by using such as sputtering or CVD.

According to FIG. 3c, the protrusion adjustment portion 36 is provided between the main magnetic pole layer 341 (the main magnetic pole main layer 3410) whose end surface is a shape of inverted trapezoid and the shielding-between-elements 37, and is a extended layer to the track-width direction like the lower shield layer 330, the upper shield layer 334, the shielding-between-elements 37, and the trailing shield portion 3450. Here, a width of the protrusion adjustment portion 36 to the track-width direction regulates a width to the track-width direction protruded by heat of the heating portion 35, and is, for example, approximately 5-150 μm.

Also, according to FIG. 3b, a width (height) $H_{PC}$ of the protrusion adjustment portion 36 perpendicular to the slider end surface 211 of the protrusion adjustment portion 36 is, for example, approximately 0.05-5 μm.

Also, in FIG. 3c, if the protrusion adjustment portion 36 is a magnetic metal layer and a distance with the main magnetic pole layer 341 is within a predetermined range, the protrusion adjustment portion 36 serves as a shield on the leading side of the main magnetic pole layer 341, the magnetic slope of the write magnetic field from the main magnetic pole layer 341 is steeper by the shunt effect of the magnetic flux. As a result, a read error rate can become smaller as a jitter of the signal output becomes smaller.

Figure 4A:
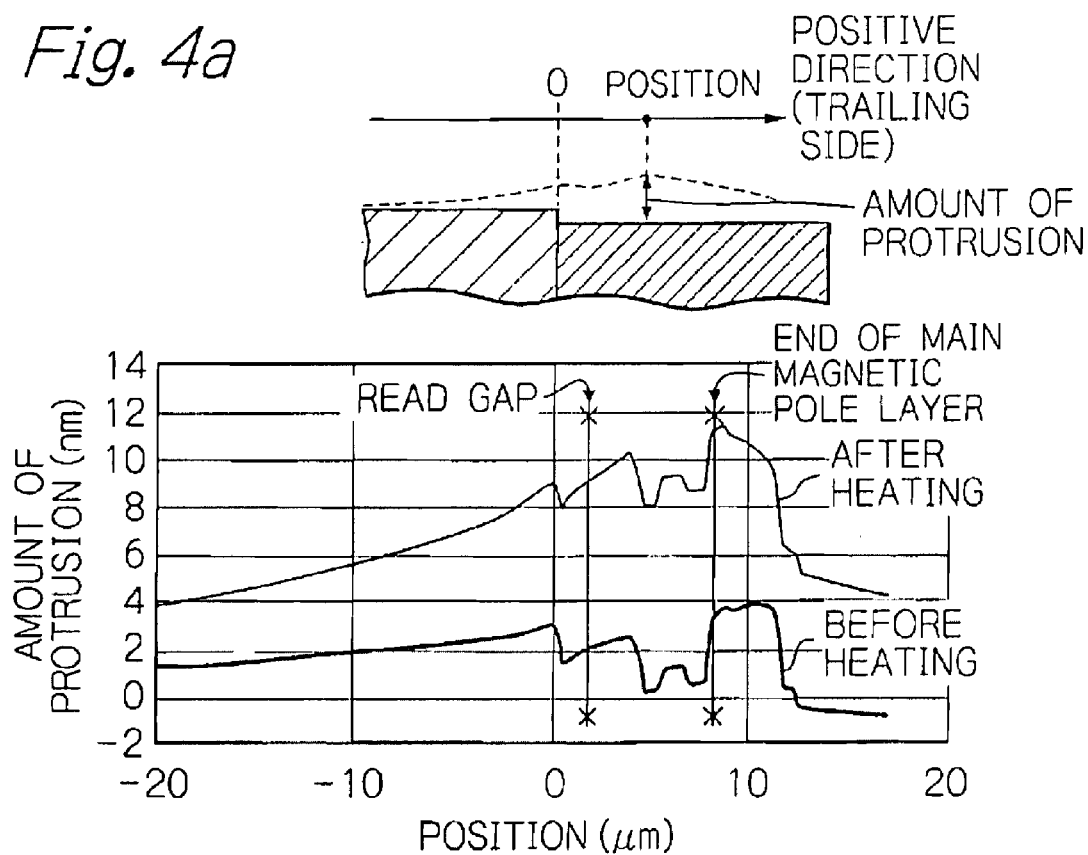
FIGS. 4a and 4b show graphs showing measured results of the protrusion profile on the slider end surface of a conventional thin-file magnetic head for perpendicular magnetic recording and the thin-file magnetic head for perpendicular magnetic recording according to present invention.
Figure 4B:
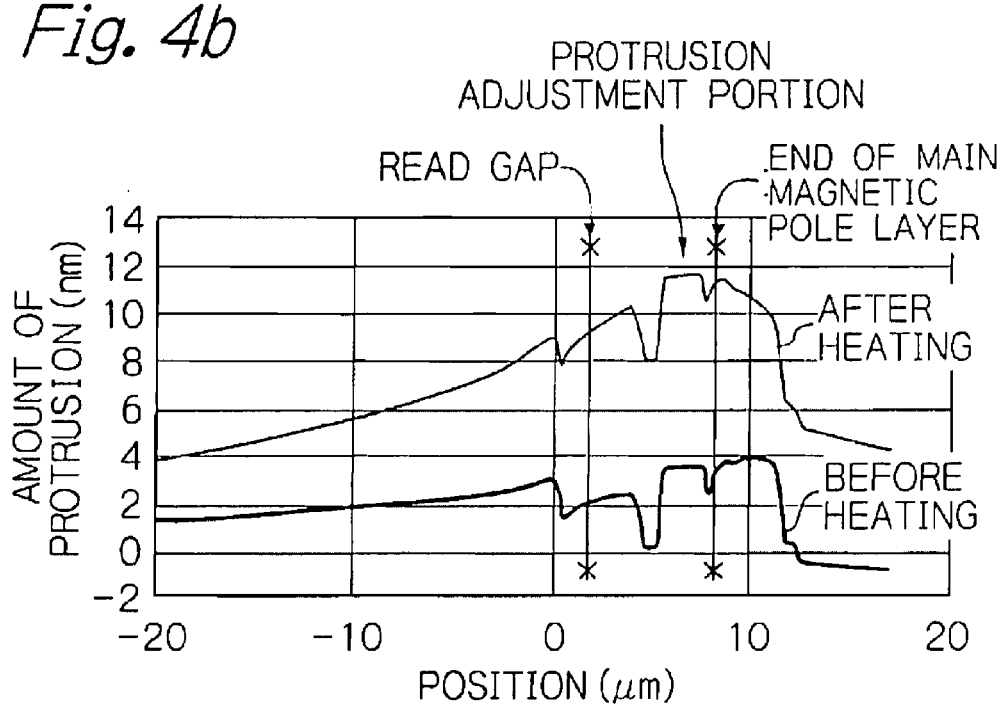

FIGS. 4a and 4b show graphs showing measured results of the protrusion profile on the slider end surface of a conventional thin-file magnetic head for perpendicular magnetic recording and the thin-file magnetic head for perpendicular magnetic recording according to present invention.

The measurement of the protrusion profile was performed by scanning the slider end surface with an atomic force microscope (AFM) after protruding this slider end surface by applying the 100 mW power to the heating portion 35. Also, the conventional thin-file magnetic head for perpendicular magnetic recording and the thin-file magnetic head (that is, the head showing FIG. 3) for perpendicular magnetic recording according to present invention used for the measurement were a same structure including the heating portion 35, except that the thin-file magnetic head for perpendicular magnetic recording according to present invention had the protrusion adjustment portion 36. Further, in the protrusion adjustment portion 36 of the thin-file magnetic head for perpendicular magnetic recording according to present invention, a width to the track-width direction was 90.0 μm, a height $H_{PC}$ (FIG. 3b) was 0.35 μm, and a thickness was 2.0 μm.

A horizontal axis of the graphs of FIGS. 4a and 4b is positioned the direction along the track on the opposed-to-medium surface, that is, the slider end surface and the ABS, and an origin is positioned the end of the slider substrate (a position of the element-formed surface), and a positive direction is a direction to the trailing side (the slider end surface side) from the origin. Also, a longitudinal axis is an amount of the protrusion when the part which does not change (protrude) by heat of the heating portion is a reference (zero) point in the ABS on the slider substrate.

Further, in the graphs of FIGS. 4a and 4b, the graphs show a position exposed the slider end surface 211 on the MR effect multilayer 332 which the MR effect element 33 comprises, that is, a position of a read gap as a position of the end of the MR effect element 33 on the slider end surface, and show a position exposed the slider end surface 211 on the main magnetic pole layer 341 which the excitation coil element 34 comprises as a position of the end of the excitation coil element 34.

According to FIG. 4a, in the conventional head for perpendicular magnetic recording, the most protruded (an amount of recess is small) part is the end of the main magnetic pole layer 341 before the heating portion 35 heats, but this situation is a same after heating. Therefore, it is found that a risk that the end of the main magnetic pole layer 341 protruding most contacts or collides the magnetic disk surface increases in the case where the flying height becomes very small with the heating portion heating.

Here, in the profile of the slider end surface 211 before the heating portion 35 heats, the reason why a difference in height occurs will be explained below. In manufacturing the head, as explained below, the slider end surface is polished and formed as well as the ABS in the case of the formation of the ABS, but the slider end surface is slightly recessed than the ABS by the polishing rate difference of a constitution material. The degree of the recess also changes with a constitution material of each layer exposed on the slider end surface 211. Concretely, for example, the end of the magnetic pole layer or the shield layer which is consists of the metal material is smaller recess than the end of the insulting layer in the vicinity of these layer. As a result, the profile of the slider end surface having the difference in height as FIG. 4a has already occurred before the heating.

Whereas, in the thin-file magnetic head for perpendicular magnetic recording according to present invention as shown in FIG. 4b, a position of the end of the protrusion adjustment portion 36 protrudes at the same level as a position of the end of the main magnetic pole layer 341 (these amount of recess are the same level) on the slider end surface 211 before the heating portion heats. Further the position of the end of the protrusion adjustment portion 36 protrudes most after heating. This reason is that the heating portion 35 is surely set rear the protrusion adjustment portion 36 viewed from the slider end surface 211 and the protrusion adjustment portion 36 most strongly receives the influence of the heat from the heating portion 35 at the position of the slider end surface 211.

Therefore, in the case where the flying height is very small with the heating portion 35 heating, when the head contacts or collides with the magnetic disk surface, the end of the protrusion adjustment portion 36 which protrudes most contacts or collides so that the contact or collision of the end of the MR effect element 33 and the end of the excitation coil element 34 can be avoided. Therefore, it is understood that the protrusion adjustment portion and the heating portion appropriately arranged by the present invention make the writing and reading characteristic improve with reducing the flying height, and make the contact or collision with the magnetic recording medium handle surely.

Figure 5:
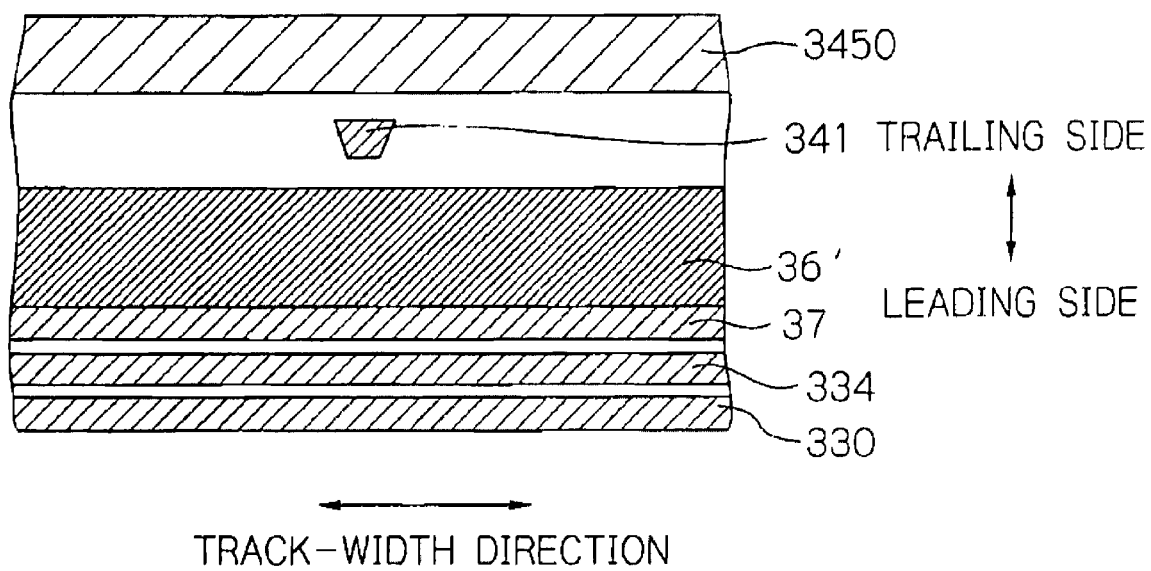
FIG. 5 shows a plain view illustrating a modified embodiment of the protrusion adjustment portion which thin-file magnetic head for perpendicular magnetic recording according to present invention comprises, and illustrating a structure of the slider end surface 211 viewed from the ABS 2100 side.

FIG. 5 shows a plain view illustrating a modified embodiment of the protrusion adjustment portion which thin-file magnetic head for perpendicular magnetic recording according to present invention comprises, and illustrating a structure of the slider end surface 211 viewed from the ABS 2100 side.

According to FIG. 5, a protrusion adjustment portion 36' fills an area between the shielding-between-elements 37 in the protrusion adjustment portion 36 of FIG. 3c, and connects and contacts with a surface of the shielding-between-elements 37. In this case, the protrusion adjustment portion 36' reaches between the backing coil portion 340 (FIG. 3a) and the slider end surface 211, and is provided in such a way as to cover a front of the backing coil portion 340.

Here, if the protrusion adjustment portion 36' is a magnetic metal layer and a distance with the main magnetic pole layer 341 is within a predetermined range, the protrusion adjustment portion 36' serves as a shield on the leading side of the main magnetic pole layer 341 with the shielding-between-elements 37. In this case, it is possible to set the shunt effect of the magnetic flux due to the protrusion adjustment portion 36' widely large, and to increase the magnetic slope of the write magnetic field from the main magnetic pole layer 341. As this suppresses the side fringe, that is the writing of the main magnetic pole layer 341 on side surface to track-width direction, a read error rate can become small even if a skew angle of the head becomes widely large.

FIG. 6a shows a cross-sectional view taken along line A-A in FIG. 2, illustrating a configuration of a main part in an alternative embodiment of the thin-film magnetic head according to the present invention, FIG. 6b shows a perspective view illustrating a cross section taken along line A-A viewed from obliquely upward.

According to FIG. 6a, as a structure of the thin-film magnetic head 21' is the same as a structure of the thin-film magnetic head 21 (FIG. 3) except an excitation coil element 44, a heating portion 45, and a protrusion adjustment portion 46, an explanation of this head is omitted.

The excitation coil element 44 is for longitudinal magnetic recording and includes a lower magnetic pole layer 440, a write gap layer 441, a write coil layer 443, a write coil insulting layer 444, and an upper magnetic pole layer 445. While the write coil layer 443 is shown as two layers in FIG. 6a, it may consist of single layer structure, and it is formed in such a manner that it passes at least between the lower magnetic pole layer 440 and the upper magnetic pole layer 445 between one turn. Also, in the excitation coil element 44, the write coil layer may consist of a helical coil structure. The lower magnetic pole layer 440 and the upper magnetic pole layer 445 sandwich the end portion on the ABS 2100' side (slider end surface 211' side) of the write gap layer 441, and are a magnetic path to guide and converge the magnetic flux excited by currents flowing through the write coil layer 443. A leakage magnetic field from this end portion of the write gap layer 441 performs a write operation onto the magnetic disk.

The lower magnetic pole layer 440 is formed of, for example, NiFe, CoFeNi, CoFe, FeN or FeZrN, etc. with a thickness of approximately 0.5-4 µm by using such as sputtering. And the upper magnetic pole layer 445 is formed of, for example, NiFe, CoFeNi, CoFe, FeN or FeZrN, etc. with a thickness of approximately 0.5-3 µm by using such as sputtering or a pattern plating method including frame plating.

The write coil layer 443 is formed of, for example, Cu, etc. with a thickness of approximately 0.3-5 µm using such as pattern plating method including frame plating. The write coil-insulating layer 444 is a plastic layer, and is formed of, for example, a heat-cured photo resist, etc. with a thickness of approximately 0.5-7 µm by using such as photolithography. Further, the write gap layer 441 is a insulting layer, and is formed of, for example, $Al_2O_3$, Ru, $SiO_2$, AlN, or DLC, etc. with a thickness of approximately 0.01-0.1 µm by using such as sputtering or CVD.

The heating portion 45 is provided between the upper shield layer 434 of the MR effect element 43 and the lower magnetic pole layer 440 of the excitation coil element 44 and rear (just at the rear in this embodiment) the protrusion adjustment portion 46 whose end reaches the slider end surface 211' viewed from the slider end surface 211'. As shown in FIG. 6b, the heating portion 45 has a heating line layer 450 meandered one line as rectangle wave in the layer and two lead line layers 451 which connect the both ends of the heating line layer 450, and is a current flow path with a predetermined length. The structure that the heating portion 45 is positioned just at the rear the protrusion adjustment portion 46 viewed from the slider end surface 211' side is realized, for example, by forming the heating portion 45 and the protrusion adjustment portion 46 on the layer having upper layer surface parallel to the element formation surface 2101'.

Here, a first main line 4500 and a second main line 4501 meandered as rectangle wave in the heating line layer 450 are provided as a form symmetric each other at the two positions symmetric each other separated to a track-width direction from a symmetric axis 490 considering a symmetric axis as a center line of the head element which is perpendicular to track-width direction.

Also, One end of the lead line layer 451 is connected the drive electrodes 52 (FIG. 2), the heating portion 45 takes power supply for the heating from the recording/reproducing and heating control circuit 13 (FIG. 1) via this drive electrodes 52. The shape of the heating line layer 450 is not limited to this shape of rectangle wave, for example, it is also possible to be one line shape which extends to track-width direction with a width of line becoming narrow on the both ends of track-width direction.

Here, the heating line layer 350 can be formed of, for example, NiCu, NiCr, Ta, W, Ti, Cu, Au or NiFe, etc. with a thickness of approximately 0.01-5 µm. Further, the lead line layer 351 can be formed of a same material as the heating line layer 350.

In FIG. 6a, the protrusion adjustment portion 46 is provided between the upper shield layer 434 and the lower magnetic pole layer 440 like the heating portion 45, and it can be reach a position its end reach the slider end surface 211'. In short, it exposes in the slider end surface 211'. Also, as shown in FIG. 6b, the protrusion adjustment portion 46 consists of two first protrusion adjustment portions 460 and a second protrusion adjustment portion 461.

Here, with respect to a positional relationship between the heating portion 45 and the protrusion adjustment portion 46, the first main line 4500 of the heating portion 45 positions rear the first protrusion adjustment portion 460 (just at the rear in this embodiment) viewed from the slider end surface 211', and the second main line 4501 positions rear the second protrusion adjustment portion 461 (just at the rear in this embodiment) viewed from the slider end surface 211'. In other view, the two protrusion adjustment portions 460 and 461 are provided between the upper shield layer 434 and the lower magnetic pole layer 440, and are provided a position symmetric each other considering a symmetric axis as a center line perpendicular to track-width direction of the MR effect element 43 and the excitation coil element 44 on the slider end surface 211'.

Here, the first and second protrusion adjustment portions 460 and 461 are a layer which consists of, for example, the metal layer, and protrude by heat of the heating portion 45 in writing or reading operation. In this case, the first protrusion adjustment portion 460 wildly protrudes by heat mainly from the first main line 4500, and the second protrusion adjustment portion 461 wildly protrudes by heat mainly from the second main line 4501. As a result, in the slider end surface 211', the first and second protrusion adjustment portions 460 and 461 protrude more on both sides of the track-width direction of ends of these head elements than the end of the MR effect element 43 and the end of the excitation coil element 44 positioned vicinity of these protrusion adjustment portions.

While the first and second protrusion adjustment portions 460 and 461 protrude most, a distance of between the end of the MR effect element 43 and the end of the excitation coil element 44 positioned vicinity of the pole and the magnetic disk surface is enough small. Further, in this situation, for example, by change of an environment factor or an impact from outside so on, or by an intentional contact (touch down) operation, if the thin-film magnetic head 21' contacts or collides the magnetic disk, a contact or collision position becomes the protrusion adjustment portion 46, then a contact or collision of the end of the MR effect element 43 and the end of the excitation coil element 44 are avoided.

While not shown, the first and second protrusion adjustment portions 460 and 461 can be grounded to the slider substrate 210' so on with providing a predetermined lead layer or connecting to a grounded layer. This can reduce an electrostatic bad effect which occurs in the case of the contact or collision of the first and second protrusion adjustment portions 460 and 461 with the magnetic disk.

The first and second protrusion adjustment portions 460 and 461 are formed of, for example, nonmagnetic metal film of Cu, Al, or, Au, etc. or magnetic metal film of NiFe (permalloy so on), CoFeNi, CoFe, FeN or FeZrN, etc. with a thickness of approximately 0.5-5 μm by using such as sputtering, respectively. By selecting construction material of the first and second protrusion adjustment portions 460 and 461, a degree that the first and second protrusion adjustment portions 460 and 461 are recessed in the case of MR height process which will be explained below is determined. This can adjust the protrusion profile of the slider end surface 211'. Also, a width of the track-width direction of the first and second protrusion adjustment portions 460 and 461 regulate a width of the track-width direction protruded by the heat of the first main line 4500 and the second main line 4501, respectively, and is, for example, approximately 5-70 μm.

Also, according to FIG. 6b, a width (height) $H_{PC}'$ of the first and second protrusion adjustment portions 460 and 461 perpendicular to the slider end surface 211' is, for example, approximately 0.05-1 μm.

Besides, the above-mentioned embodiment using the two protrusion adjustment portions is the case that the excitation coil element is for longitudinal magnetic recording, but, the two protrusion adjustment portions can be provided on both sides to the track-width direction of the main magnetic pole layer 341 (FIG. 3c), respectively, in the case where the excitation coil element is also for perpendicular magnetic recording. In this case, the two protrusion adjustment portions make the contact to the end of the main magnetic pole layer 341 avoid, moreover, serves as a side shield of the main magnetic pole layer 341. This can contribute to restraint of a side fringe as well as makes a magnetic slope of the write magnetic filed large.

Figure 7A:
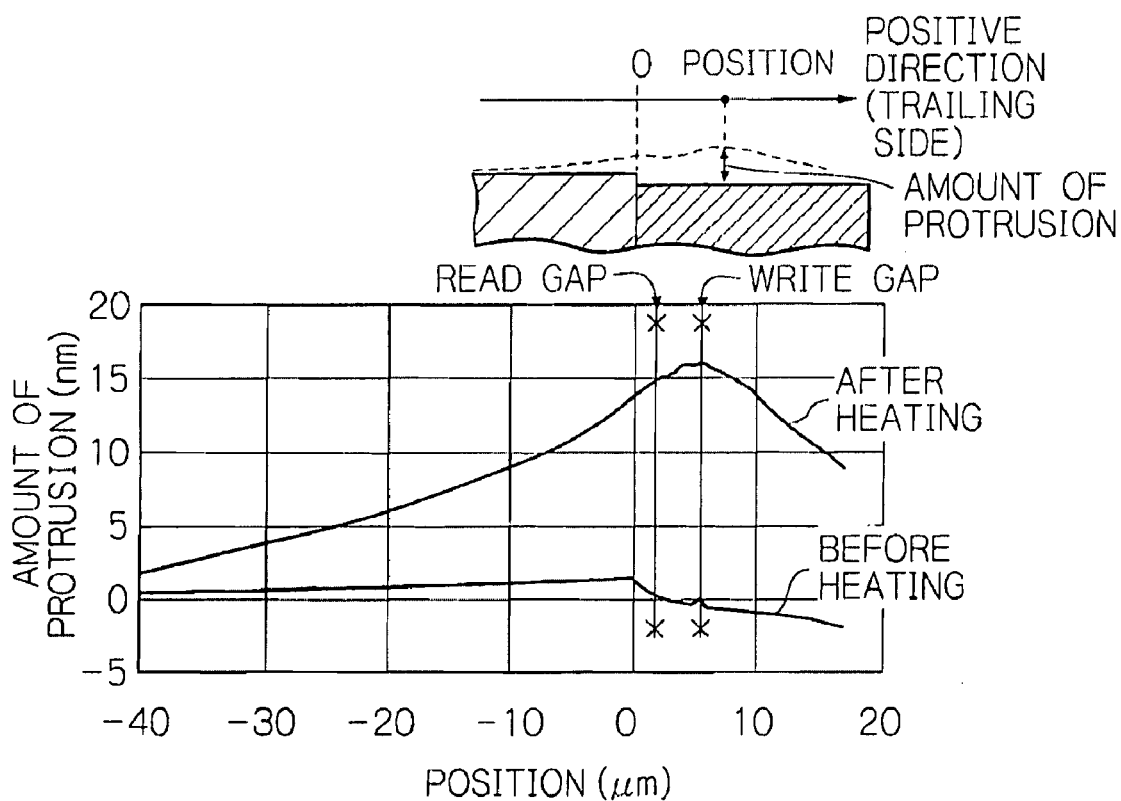
FIGS. 7a and 7b show graphs and schematic diagrams illustrating a protrusion profile on the slider end surface of the conventional thin-film magnetic head for longitudinal magnetic recording and the thin-film magnetic head for longitudinal magnetic recording according to present invention.
Figure 7B:
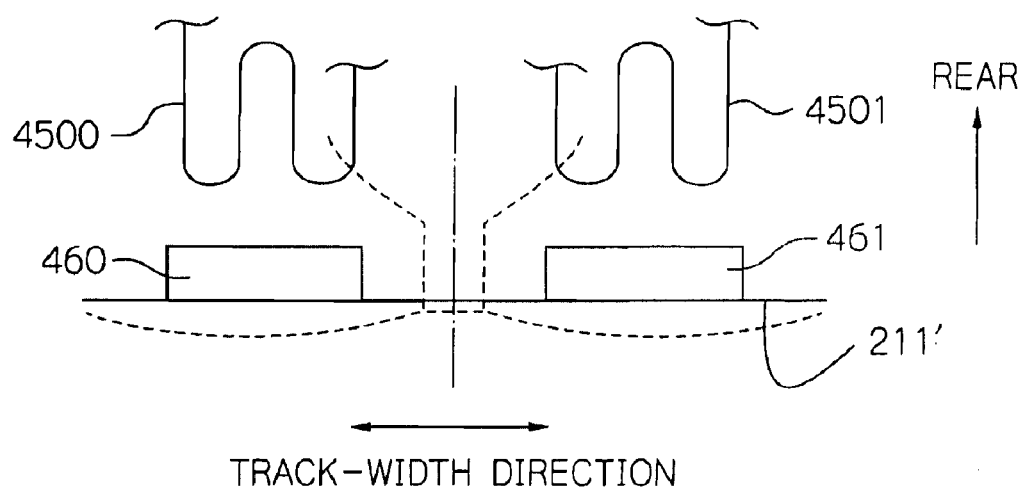

FIGS. 7a and 7b show graphs and schematic diagrams illustrating a protrusion profile on the slider end surface of the conventional thin-film magnetic head for longitudinal magnetic recording and the thin-film magnetic head for longitudinal magnetic recording according to present invention.

The measurement of the protrusion profile of conventional thin-film magnetic head for longitudinal magnetic recording was performed by scanning the slider end surface with the AFM after protruding this slider end surface by applying the 100 mW power to the heating portion 45. Also, the conventional head and the head (that is, the embodiment showing FIG. 6) for longitudinal magnetic recording according to present invention used for the measurement were a same structure including the heating portion 45, except that the head according to present invention had the protrusion adjustment portion 46.

A horizontal axis of the graph of FIG. 7a is positioned the direction along the track on the slider end surface and the ABS of the thin-film magnetic head, and an origin is positioned the end of the slider substrate (a position of the element-formed surface), and a positive direction is a direction to the trailing side (the slider end surface side) from the origin. Also, a longitudinal axis is an amount of the protrusion when the part which does not change (protrude) by heat of the heating portion is a reference (zero) point in the ABS on the slider substrate.

Further, in the graph of FIG. 7a, the graph shows a position exposed the slider end surface 211' on the MR effect multilayer which the MR effect element 43 comprises, that is, a position of a read gap as a position of the end of the MR effect element 43 on the slider end surface, and shows a position exposed the slider end surface 211' on the write gap layer 441 which the excitation coil element 44 comprises, that is, a position of a write gap as a position of the end of the excitation coil element 44.

According to FIG. 7a, in the conventional head for longitudinal magnetic recording, the most protruded (an amount of recess is small) part is the position of the origin on the slider end surface 211' before the heating portion 45 heats, an amount of the protrusion on the position of the end of the excitation coil element 44 is smaller (an amount of recess is large) than an amount of the protrusion on the position of the end of MR effect element 43. As a result, after the heating portion 45 heats, the position of the end of MR effect element 43 as well as the position of the end of the excitation coil element 44 which protrudes most also widely protrudes. Therefore, it is found that a risk that the end of MR effect element 43 as well as the end of the excitation coil element 44 which protrudes most contacts or collides the magnetic disk surface increases in the case where the flying height becomes very small with the heating portion 45 heating.

Here, in the head for longitudinal magnetic recording, usually a spacing between the position of the end of MR effect element 43 and the position of the end of the excitation coil element 44 is much smaller than that of the head for perpendicular magnetic recording. Therefore it is difficult widely to regulate the protrusion profile even if a protrusion formation portion is simply provided between the end of MR effect element 43 and the end of the excitation coil element 44. Also, in the profile of the slider end surface 211' before the heating portion 45 heats, the reason why a difference in height occurs is same as the reason explained in FIG. 4.

Whereas, in the head for longitudinal magnetic recording according to present invention as shown in FIG. 7b, the end of the first protrusion adjustment portion 460 and the end of the second protrusion adjustment portion 461 protrude most on the track-width direction of the slider end surface 211' after the heating portion 45 heats. In this case, the protrusion profile becomes mild W-shape which the end of the center head element is reentrant. This reason is that the first main line 4500 and the second main line 4501 of the heating portion 45 is surely set rear the first protrusion adjustment portion 460 and the second protrusion adjustment portion 461, respectively, viewed from the slider end surface 211' and the first protrusion adjustment portion 460 and the second protrusion adjustment portion 461 most strongly receives the influence of heat from the heating portion 45 at the position of the slider end surface 211'.

Therefore, in the case where the flying height is very small with the heating portion 45 heating, when the head contacts or collides with the magnetic disk surface, the first protrusion adjustment portion 460 and the second protrusion adjustment portion 461 which protrudes most contact or collide so that the contact or collision of the end of the MR effect element and the end of the excitation coil element can be avoided. Therefore, it is understood that the protrusion adjustment portion and the heating portion appropriately arranged by the present invention make the writing and reading characteristic improve with reducing the flying height, and the contact or collision to the magnetic recording medium handle surely.

Figure 8A:
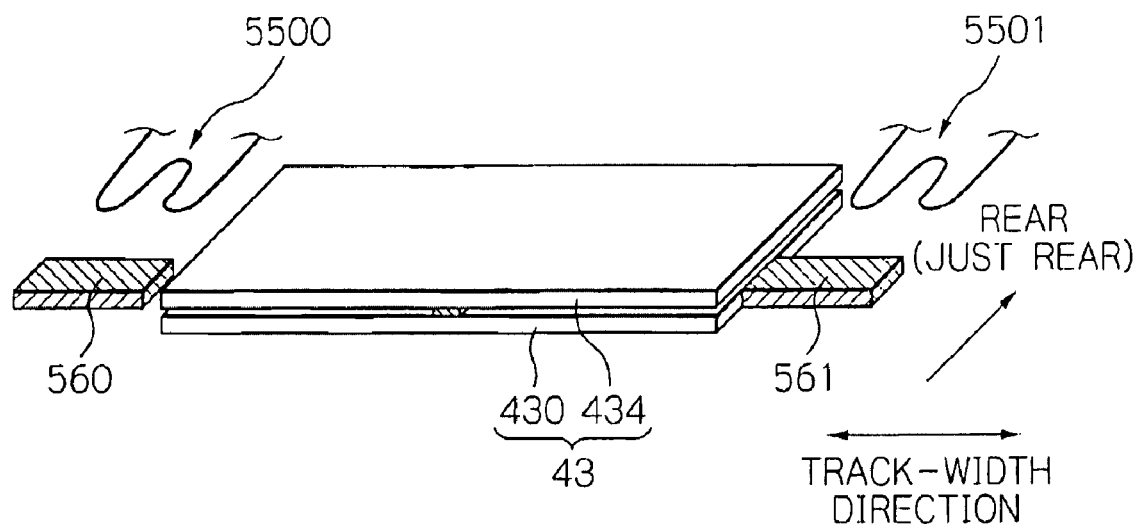
FIGS. 8a and 8b show perspective views illustrating an alternative embodiment of the protrusion adjustment portion which the thin-file magnetic head for longitudinal magnetic recording according to present invention comprises, and illustrating a configuration of the heating portion and the protrusion adjustment portion viewed from obliquely upward ABS 2100' side.
Figure 8B:
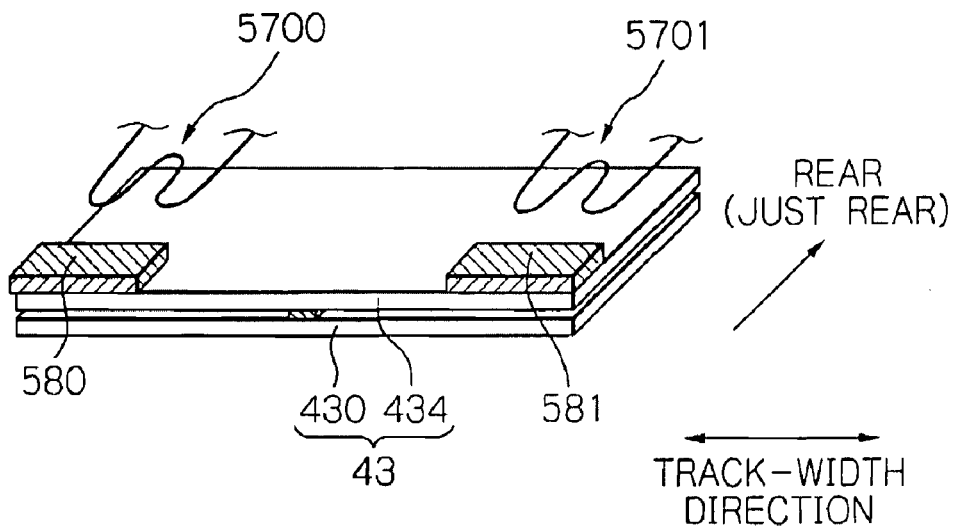

FIGS. 8a and 8b show perspective views illustrating an alternative embodiment of the protrusion adjustment portion which the thin-file magnetic head for longitudinal magnetic recording according to present invention comprises, and illustrating a configuration of the heating portion and the protrusion adjustment portion viewed from obliquely upward ABS 2100' side.

According to FIG. 8a, a first protrusion adjustment portion 560 and a second protrusion adjustment portion 561 are provided on the both sides to track-width direction of the upper shield layer 434 which the MR effect element 43 includes, respectively. Also, the first main line 5500 and the second main line 5501 are provided rear the first protrusion adjustment portion 560 and the second protrusion adjustment portion 561, respectively, viewed from the slider end surface side (front side on paper). In such an embodiment, as the protrusion profile to track-width direction of the slider end surface becomes a shape which the end of the center head element is reentrant, the writing and reading characteristic is improved with reducing the flying height, and the contact or collision to the magnetic recording medium can be handled surely.

Also, the first and second protrusion adjustment portions 560 and 561, respectively, can be provided on the both sides to track-width direction of the MR effect element 43, on the both sides to track-width direction of the excitation coil element 44, or on the both sides to track-width direction of area between these elements, for example, they can be provided on the both sides of the lower shield layer 430 which the MR effect element 43 includes. Also, the first and second main lines 5500 and 5501 can be independent heating portions, respectively.

According to FIG. 8b, a first protrusion adjustment portion 580 and a second protrusion adjustment portion 581 are provided on an upper surface of the upper shield layer 434 which the MR effect element 43 includes, respectively, with contacting the surface on the both ends to track-width direction. Also, the first main line 5700 and the second main line 5701 are provided rear the first and second protrusion adjustment portions 580 and 581, respectively, viewed from the slider end surface (front side on paper). In such an embodiment, as the protrusion profile to track-width direction of the slider end surface becomes a shape which the end of the center head element is reentrant, the writing and reading characteristic can be improved with reducing the flying height, and the contact or collision to the magnetic recording medium can be handled surely.

Particularly, the protrusion profile on a position of the first and the second protrusion adjustment portions 580 and 581 becomes smooth on the track-width direction by existence of the contacting upper shield layer 434. As a result, while the contact or collision to the magnetic recording medium is handled surely, the end of the magnetic head element more surely can come near the magnetic disk surface. As the first and the second protrusion adjustment portions 580 and 581 and the upper shield layer 434 became a same electrical potential, this can reduce an electrostatic bad effect which occurs in the case of the contact or collision of the protrusion adjustment portion and the magnetic recording medium.

Also, in thin-film magnetic head according to the present invention, that the protrusion adjustment portion and the heating portion positioned rear (just at rear or diagonally rear) this protrusion adjustment portion viewed from the slider end surface side of the ABS side are provided is large characteristic, by arranging the protrusion adjustment portion at position which wants to protrude most on the slider end surface, the protrusion profile can be designed freely. Therefore, in thin-film magnetic head according to the present invention, according to predetermined the protrusion profile, the protrusion adjustment portion and the heating portion is arranged, the configuration arranged these way belongs to the scope of the present invention.

Figure 9:
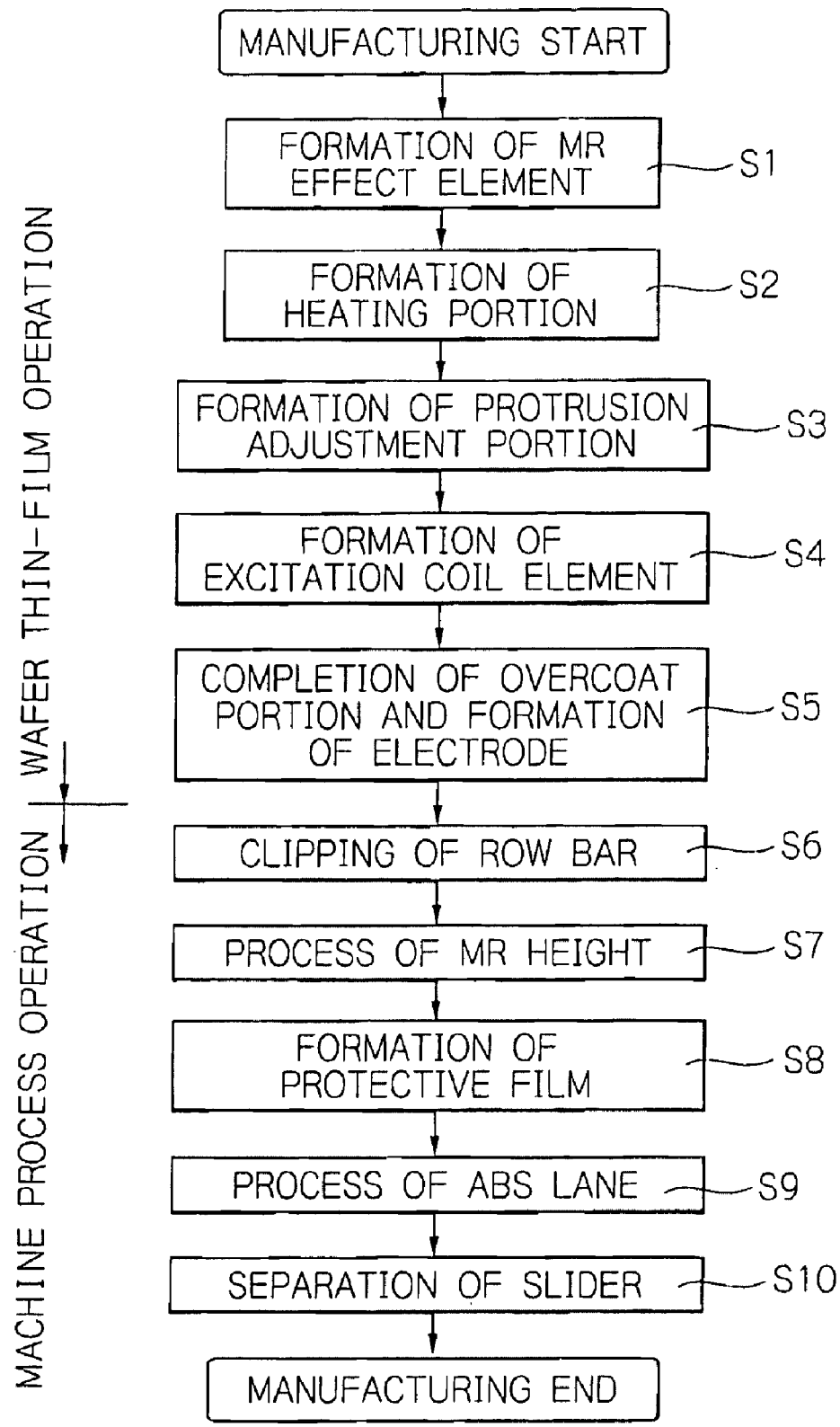
FIG. 9 shows a flow chart schematically illustrating an embodiment of manufacturing method of the thin-film magnetic head according to the present invention.

FIG. 9 shows a flow chart schematically illustrating an embodiment of manufacturing method of the thin-film magnetic head according to the present invention. Also, FIGS. 10a to 10f show schematic diagrams explaining a machine process operation of manufacturing method of the thin-film magnetic head according to the present invention. The manufacturing method of the head for longitudinal magnetic recording showing FIG. 3 will be explained, but the manufacturing method of the head for perpendicular magnetic recording showing FIG. 6 also will be manufactured by same steps.

According FIG. 9, first, the MR effect element 33 is formed on the element formation surface of a wafer substrate for the thin-film magnetic head (step S1). Next, the heating portion 35 is formed (step S2), then, the protrusion adjustment portion 36 is formed (step S3). Here, the protrusion adjustment portion 36 is formed between the MR effect element 33 and the excitation coil element 34 which will be formed later and at least on a position exposed to a polishing surface that becomes the slider end surface 211. Also, the heating portion 35 is formed between the MR effect element 33 and the excitation coil element 34 which will be formed later and rear the protrusion adjustment portion 36 viewed from the slider end surface 211.

Next, the excitation coil element 34 is formed (step S4). By the above, the heating head elements which includes the MR effect element 33, the heating portion 35, the protrusion adjustment portion 36, and the excitation coil element 34 are formed on the element formation surface of wafer substrate with arranging matrix state. The formation of the heating portion 35 (step S2) and the formation of the protrusion adjustment portion 36 (step S3) can be performed in inverse order or simultaneously.

Then, the overcoat portion 38 is finished, next the signal electrodes 50 and 51 and the drive electrodes 52 are formed (step S5). By the above, a wafer thin-film operation for forming the heating head element and electrodes on the wafer substrate is finished. According FIG. 10a, a pattern 61 of a lot of heating head elements and electrodes is formed with arranging a matrix state on the element formation surface of a slider wafer 60 that is the wafer substrate finished the wafer thin-film operation.

Figure 10A:
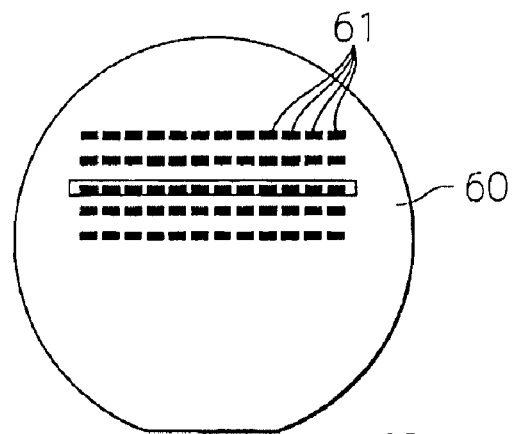
FIGS. 10a to 10f show schematic diagrams explaining a machine process operation of manufacturing method of the thin-film magnetic head according to the present invention.
Figure 10B:
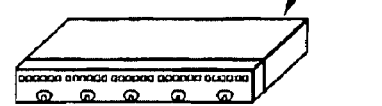

Next, according FIG. 9, the wafer substrate finished the wafer thin-film operation is cut, and a row bar is clipped (step S6). Concretely, the slider wafer 60 of FIG. 10a is bonded with plastic so on to a jig for separation by cutting and is cut, as shown in FIG. 10b, the row bar 62 that the pattern 61 of a lot of heating head elements and electrodes are arranged in line is clipped.

Figure 10C:
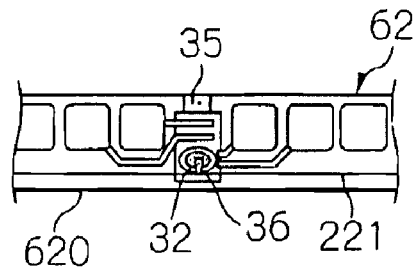

Then, according FIG. 9, this row bar is given a MR height process (step S7). In this MR height process, for example, a chemical mechanical polishing (CMP) is performed to the cutting surface of the row bar exposed the end of the MR effect element 33, the end of the excitation coil element 34, the protrusion adjustment portion 36 and the overcoat portion 38. Concretely, bonding the row bar 62 of FIG. 10b to a polishing jig using a plastic so on, as shown in FIG. 10c, an end surface 620 that is an ABS side of the this row bar 62 is given the CMP as a polishing operation which determines the MR height of the MR effect element 33, that is, a length in a direction to perpendicular the ABS. This MR height process is performed until the magnetic head element 32 and the protrusion adjustment portion exposes on the slider end surface 211 and the MR effect multilayer 332 of the MR effect element 33 becomes a predetermined MR height finally.

Figure 10D:
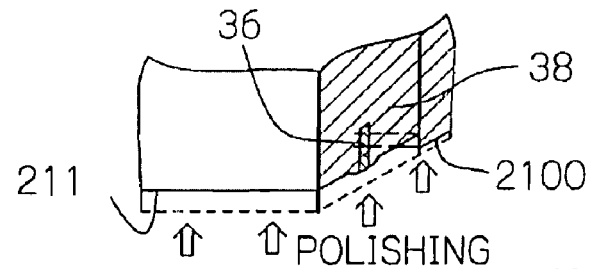

In this case, using the above-mentioned metal material for the protrusion adjustment portion 36 and the above-mentioned oxide or nitride insulting material for the overcoat portion 38, a polishing rate due to the CMP of the protrusion adjustment portion 36 becomes smaller than that of the overcoat portion 38. Generally, in the CMP, it is known that the polishing rate of the film which consists of the metal material is smaller than that of the film which consists of the oxide or nitride insulting material. As shown in FIG. 10d, this forms the slider end surface 211 that the end portion of the protrusion adjustment portion 36 protrudes (an amount of recess is small) more than that of the overcoat portion 38. Further, as the formed slider end surface 211 has the polishing rate much smaller than that of the substrate (AlTiC), it recesses from the formed ABS 2100 as a whole. In the operation of thin-film magnetic head, the writing and reading characteristic can be improved with reducing the flying height, and the contact or collision with the magnetic disk occurs on the protrusion adjustment portion 36.

Also, the process which occurs these recess difference is not limited the polishing, then it can be a dry etching such as ion beam etching (IBE) or a wet etching with alkali solution. In any case, the construction material of the protrusion adjustment portion 36 is selected the material that the rare of the polishing or etching is smaller than that of the construction material of the overcoat portion 38.

Figure 10E:
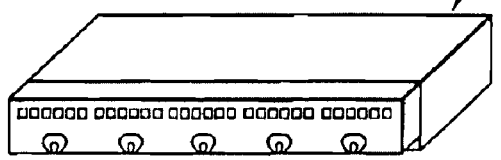
Figure 10F:
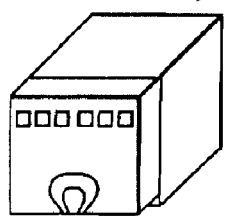

Next, according FIG. 9, a protective film which consists of diamond-like carbon (DLC) and so on is formed on the formed slider end surface 211 (step S8). And then, a lane for flying is formed on the ABS (step S9). Concretely, for example, bonding the row bar 62 to a jig for forming the lane with plastic so on, the lane is formed on the ABS using the photolithography method and an ion milling or a reactive ion etching method (RIE) so on. Then the row bar 63 shown in FIG. 10e is accomplished. By the above, the manufacturing process has finished.

Next, according FIG. 9, by cutting out this row bar, a separate thin-film magnetic head (slider) 21 is split off (step S10). Concretely, for example, bonding the row bar 63 of FIG. 10e to a jig for separation with plastic so on, the groove is formed, then cutting out the row bar 63, the thin-film magnetic head 21 is accomplished shown in FIG. 10f. Then the machine process operation has finished, and the manufacturing method of the thin-film magnetic head 21 has finished.

By above-mentioned manufacturing method, the thin-film magnetic head according to the present invention which appropriately arranged the heating portion and the protrusion adjustment portion is surely manufactured.

Figure 11A:
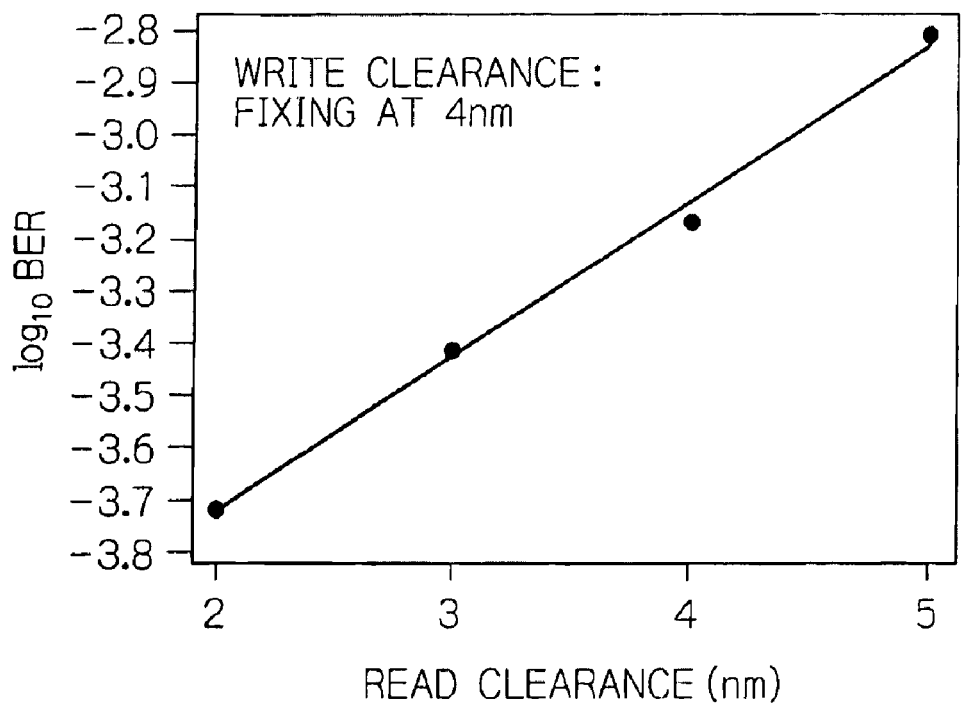
FIGS. 11a and 11b show graphs illustrating a relationship between a clearance and a byte error rate on the end of the head element of the thin-film magnetic head for perpendicular magnetic recording according to present invention.
Figure 11B:
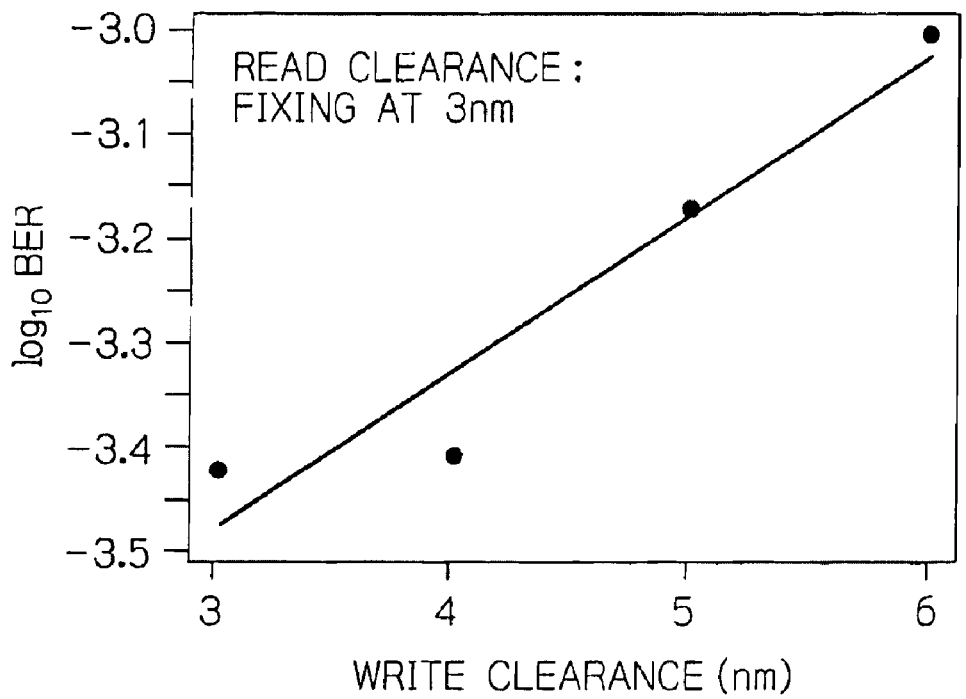

FIGS. 11a and 11b show graphs illustrating a relationship between a clearance and a byte error rate on the end of the head element of the thin-film magnetic head for perpendicular magnetic recording according to present invention.

A horizontal axis of FIG. 11a is a read clearance, that is a distance between the end of the MR effect element and the magnetic disk surface. A longitudinal axis is common logarithm of the byte error rate (BER). In measurement of the BER, a reference signals are written with a write clearance, that is a distance between the end of the excitation coil element (the main magnetic pole layer) and the magnetic disk surface, fixed to 4 nm, next the written reference signals are read with various read clearance, then the byte error rate is measured. Besides, the MR effect element using for reading in this embodiment is the TMR effect element.

Also, A horizontal axis of FIG. 11b is a read clearance. A longitudinal axis is common logarithm of the BER. In measurement of the BER, first, a reference signals are written with the various write clearance, next fixed the read clearance to 3 nm, the written various reference signals are read, then the byte error rate is measured. A setting and adjustment of the read clearance and the write clearance are performed by an adjustment of supply power to the heating portion.

The flying height is a distance between the head portion which is nearest to the magnetic disk and the magnetic disk surface, that is a minimum distance between the head and the magnetic disk surface. If the flying height is a spacing on the protrusion adjustment portion which protrudes most, amounts of the read clearance and the write clearance are slightly larger than the flying height.

According FIG. 11a, the read clearance becomes smaller from 5 nm to 2 nm, the BER is widely reduced. Further, according FIG. 11b, the write clearance becomes smaller from 6 nm to 3 nm, the BER is widely reduced. In the conventional head, the flying height is approximately 10 nm, and the clearance is equal to or more 10 nm, but the clearance in this embodiment is much smaller than this.

Next, the supply power to the heating portion becomes larger, then the touch down which contacts the thin-film magnetic head to the magnetic disk surface is performed. Here, the slider end surface of the thin-film magnetic head is observed using the electron scanning microscope before and after the touch down, then the contact position at the touch down is specified. The contact position is the protrusion adjustment portion and it is confirmed that the end of the MR effect element and the end of the excitation coil element do not contact the magnetic disk.

By above result, the thin-film magnetic head according to present invent can improve the writing and reading characteristic with reducing the clearance (the flying height) and surely handles the contact or collision to the magnetic disk.

This can improve both the writing and reading characteristic and reliability of the magnetic recording/reproducing apparatus.

Here, the preferred position of the heating portion 35 shown in FIG. 3a will be explained.

Figure 12:
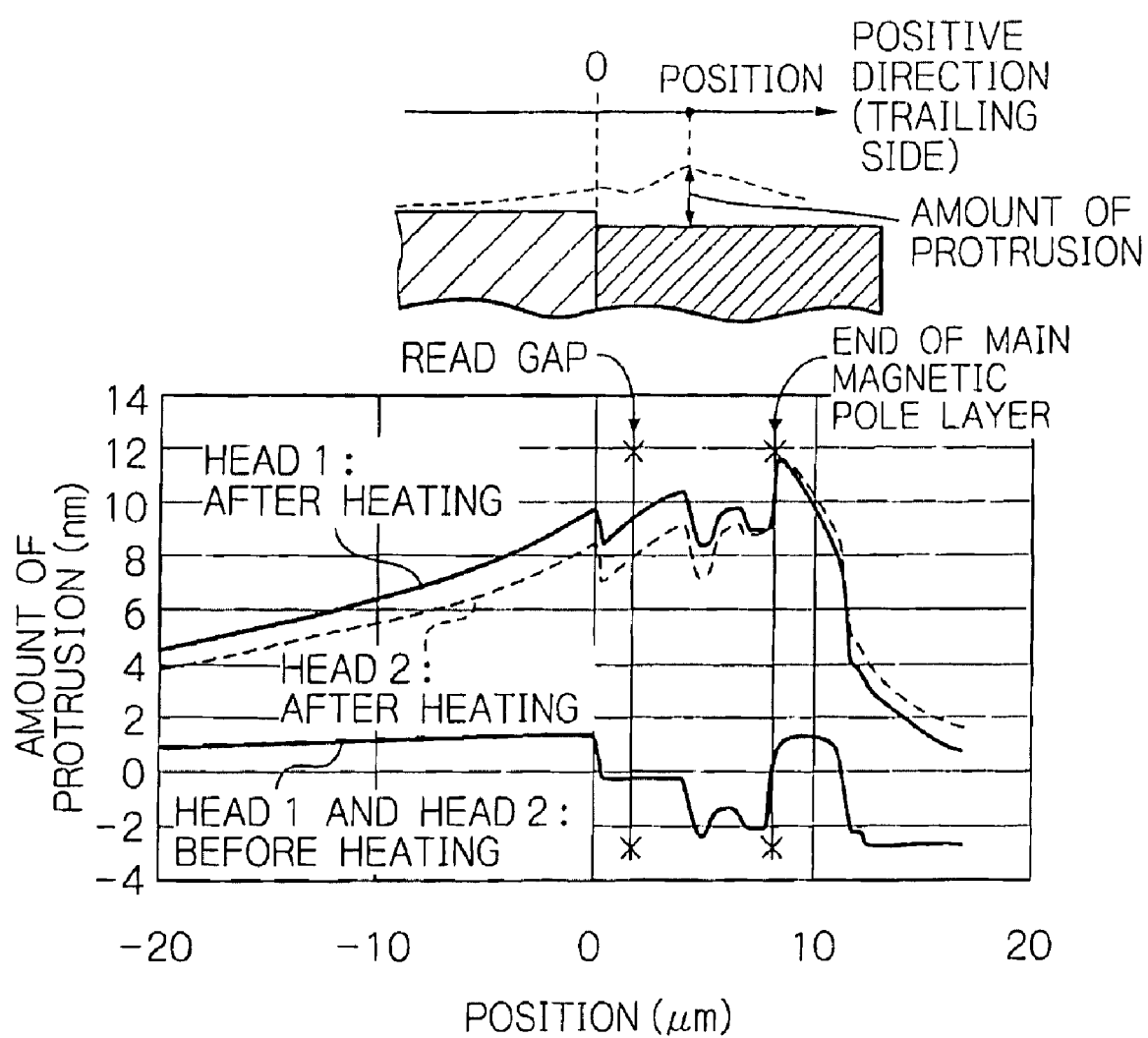
FIG. 12 shows a graph illustrating a measurement result of the protrusion profile on the slider end surface in the case where the heating portion is below or upper the backing coil portion.

FIG. 12 shows a graph illustrating a measurement result of the protrusion profile on the slider end surface in the case where the heating portion is below or upper the backing coil portion.

Heads 1 and 2 used the measurement are for perpendicular magnetic recording without the protrusion adjustment layer, and in the head 1, the heating portion is provided on intermediate position between shielding-between-elements and the backing coil portion, and in the head 2, the heating portion is provided on intermediate position between the backing coil portion and the main magnetic pole layer. Further, both heads are same construction except a setting position of the heating body. And the measurement of the protrusion profile is performed by scanning this slider end surface using AFM after protruding the slider end surface by supplying 100 mW power to the heating portion.

Also, the horizontal and longitudinal axes of the graph in FIG. 12 are wholly similar to the horizontal and longitudinal axes of the graph in FIGS. 4a and 4b, but in the graph showing the heads 1 and 2 after heating, as the basis for an amount of protrusion on the end of the main magnetic pole layer of the head 2 which protrudes most, in such a way an amount of protrusion on the end of the main magnetic pole layer of the head 1 is consistent with an amount of protrusion on the end of the main magnetic pole layer of the head 2, the graph of the head 1 is moved to longitudinal axis direction. This corresponds the state that both heads touch down the magnetic disk then the predetermined same flying height is ensured together.

According FIG. 12, there is no difference of the protrusion profile before heating on both heads, but after heating the read gap position of the head 1 protrudes more than the read gap position of the head 2. That is to say, the construction (head 1) that the heating portion is provided between the shielding-between-elements and the backing coil portion can make the read clearance smaller than the construction (head 2) that the heating portion is provided between the backing coil portion and the main magnetic pole layer, as a result, it is found that the reading characteristic is improved. This is understood from the main magnetic pole layer particularly protrudes if the heating portion is too near the main magnetic pole layer.

Although the protrusion profile of the FIG. 12 is a case which does not include the protrusion adjustment portion, in the case of including the protrusion adjustment portion, it is obvious that protrusion inclination of the read gap on the heating portion is similar.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
a substrate with an air bearing surface;
a read head element and a write head element, the read head element or the write head element provided on an element-formed surface of the substrate;
at least one protrusion adjustment portion provided on the element-formed surface of the substrate, an end of the at least one protrusion adjustment portion reaching a slider end surface on an air bearing surface side; and
at least one heating portion provided rear of the at least one protrusion adjustment portion viewed from the slider end surface side on the air bearing surface side,
wherein the at least one protrusion adjustment portion is a layer formed of a metal material.

2. The thin-film magnetic head as claimed in claim 1, wherein the end of the at least one protrusion adjustment portion is provided on a position which projects most by heat of the at least one heating portion on the slider end surface on the air bearing surface side.

3. The thin-film magnetic head as claimed in claim 1, wherein the at least one heating portion is provided just rear of the at least one protrusion adjustment portion viewed from the slider end surface on the air bearing surface side.

4. The thin-film magnetic head as claimed in claim 1, wherein the at least one protrusion adjustment portion is connected to ground.

5. The thin-film magnetic head as claimed in claim 1, wherein least one of the at least one heating portion and the at least one protrusion adjustment portion is provided between the read head element and the write head element.

6. The thin-film magnetic head as claimed in claim 1, wherein the write head element is for perpendicular magnetic recording, and has a main magnetic pole layer on a read head element side, the at least one protrusion adjustment portion is provided between the main magnetic pole layer and the read head element.

7. The thin-film magnetic head as claimed in claim 6, wherein a shielding-between-element layer is provided between the write head element and the read head element, and the at least one protrusion adjustment portion is provided between the write head element and the shielding-between-element layer.

8. The thin-film magnetic head as claimed in claim 7, wherein write head element comprises a backing coil portion closer to the read head element side than the main magnetic pole layer, and the at least one protrusion adjustment portion reaches at least between the backing coil portion and the slider end surface on the air bearing surface side and is connected to the shielding-between-element layer.

9. The thin-film magnetic head as claimed in claim 7, wherein the write head element comprises a backing coil portion closer to the read head element side than the main magnetic pole layer, and the at least one heating portion is provided between the backing coil portion and the shielding-between-element layer.

10. The thin-film magnetic head as claimed in claim 6, wherein the at least one protrusion adjustment portion is a layer formed of a magnetic material.

11. The thin-film magnetic head as claimed in claim 1, wherein the at least one protrusion adjustment portion is two protrusion adjustment portions, and the write head element is for perpendicular magnetic recording, and the write head element comprises a main magnetic pole layer on a read head element side, and the two protrusion adjustment portions are provided on two sides, in a track-width direction, of the main magnetic pole layer, respectively.

12. The thin-film magnetic head as claimed in claim 1, wherein the at least one protrusion adjustment portion is two protrusion adjustment portions, and the write head element is for longitudinal magnetic recording and comprises a magnetic pole layer on a read head element side, and the read head element comprises a shield layer on a write head element side, and the two protrusion adjustment portions are provided between the magnetic pole layer and the shield layer and a position symmetric each other with respect to a center line which is perpendicular to a track-width direction of the write head element and the read head element on the slider end surface on the air bearing surface side.

13. The thin-film magnetic head as claimed in claim 1, wherein the at least one protrusion adjustment portion is two protrusion adjustment portions, and the write head element is for longitudinal magnetic recording, and the two protrusion adjustment portions are provided on both sides, in a track-width direction, of the write head element, on both sides, in the track-width direction, of the read head element, and on both sides in, the track-width direction of an area between the write head element and the read head element.

14. A thin-film magnetic head comprising:
a substrate with an air bearing surface;
a read head element and a write head element, the read head element or the write head element provided on an element-formed surface of the substrate;
at least one protrusion adjustment portion provided on the element-formed surface of the substrate, an end of the at least one protrusion adjustment portion reaching a slider end surface on an air bearing surface side; and
at least one heating portion provided rear of the at least one protrusion adjustment portion viewed from the slider end surface side on the air bearing surface side, wherein
the at least one protrusion adjustment portion is a layer formed of a metal material,
the write head element is for perpendicular magnetic recording, and has a main magnetic pole layer on a read head element side, the at least one protrusion adjustment portion is provided between the main magnetic pole layer and the read head element,
a shielding-between-element layer is provided between the write head element and the read head element, and the at least one protrusion adjustment portion is provided between the write head element and the shielding-between-element layer, and
the write head element comprises a backing coil portion closer to a read element side than the main magnetic pole layer, and the at least one protrusion adjustment portion reaches at least between the backing coil portion and the slider end surface on the air bearing surface side and is connected to the shielding-between-element layer.

15. A head gimbal assembly comprising:
a thin-film magnetic head comprising:
a substrate with an air bearing surface;
a read head element and a write head element, the read head element or the write head element provided on an element-formed surface of the substrate;
at least one protrusion adjustment portion provided on the element-formed surface of the substrate, an end of the at least one protrusion adjustment portion reaching a slider end surface on an air bearing surface side;
at least one heating portion provided rear of the at least one protrusion adjustment portion viewed from the slider end surface side on the air bearing surface side,
wherein the at least one protrusion adjustment portion is a layer formed of a metal material;
a support mechanism for supporting the thin-film magnetic head;
trace conductors for the write head element and the read head element; and
leads for supplying power to the heating portion.

16. A magnetic recording/reproducing apparatus comprising:
at least one head gimbal assembly comprising:
a thin-film magnetic head comprising:
a substrate with an air bearing surface;
a read head element and a write head element, the read head element or the write head element provided on an element-formed surface of the substrate;
at least one protrusion adjustment portion provided on the element-formed surface of the substrate, an end of the at least one protrusion adjustment portion reaching a slider end surface on an air bearing surface side;
at least one heating portion provided rear of the at least one protrusion adjustment portion viewed from the slider end surface side on the air bearing surface side,
wherein the at least one protrusion adjustment portion is a layer formed of a metal material;
a support mechanism for supporting the thin-film magnetic head;
trace conductors for the write head element and the read head element; and
leads for supplying power to the heating portion;
at least one magnetic recording medium; and
a recording/reproducing and heating controlling circuit for controlling the write and read operation which the thin-film magnetic head performs to the at least one magnetic recording medium and also controlling power supplying to the heating portion.

17. The magnetic recording/reproducing apparatus as claimed in claim 16, wherein the at least one magnetic recording medium includes at least one contact lane on a contact lane surface portion and which the thin-film magnetic head contacts with in a case of measuring a flying height.

18. A manufacturing method of a thin-file magnetic head including:
a substrate with an air bearing surface;
a read head element and a write head element, the read head element or the write head element provided on an element-formed surface of the substrate;
at least one protrusion adjustment portion provided on the element-formed surface of the substrate, an end of the at least one protrusion adjustment portion reaching a slider end surface on an air bearing surface side; and
at least one heating portion provided rear of the at least one protrusion adjustment portion viewed from the slider end surface side on the air bearing surface side,
wherein the at least one protrusion adjustment portion is a layer formed of a metal material,
the method comprising steps of:
forming a plurality of heating head elements which include the read head element, a write head element, a heating portion positioned between the read head element and the write head element, and a protrusion adjustment portion positioned between the read head element and the write head element and positioned at least a place exposed on a polished surface that is a medium opposed surface;
forming an overcoat portion covering the read head element, the write head element, the heating portion, and the protrusion adjustment portion when or after forming the heating head element;
separating a row bar or slider which includes at least one the heating head element with cutting the substrate on which the heating head element and the overcoat portion are formed; and
forming the medium opposed surface which an end portion of the protrusion adjustment portion protrudes with performing a polishing in which a polishing rate of the protrusion adjustment portion is smaller than that of the overcoat portion toward a cutting surface which an end portion of the read head element, an end portion of the write head element, the protrusion adjustment portion, and the overcoat portion are exposed, in the row bar or slider, wherein the manufacturing method uses the layer consisting of the metal material as the protrusion adjustment portion.

19. A manufacturing method as claimed in claim 18, wherein the manufacturing method uses an oxide or nitride insulting material as the overcoat portion, and uses a chemical mechanical polishing method as the polishing.

* * * * *